United States Patent
Spengler et al.

(10) Patent No.: US 7,774,202 B2
(45) Date of Patent: Aug. 10, 2010

(54) SPEECH ACTIVATED CONTROL SYSTEM AND RELATED METHODS

(75) Inventors: Richard P. Spengler, Fort Worth, TX (US); Jon C. Russo, Cherry Hill, NJ (US); Gregory W. Barnett, Merchantville, NJ (US); Kermit L. Armbruster, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 1094 days.

(21) Appl. No.: 11/451,217

(22) Filed: Jun. 12, 2006

(65) Prior Publication Data

US 2007/0288242 A1    Dec. 13, 2007

(51) Int. Cl.
*G10L 19/14* (2006.01)
(52) U.S. Cl. .................... 704/236; 704/241
(58) Field of Classification Search ............ 704/236, 704/241
See application file for complete search history.

(56) References Cited

U.S. PATENT DOCUMENTS

| | | | |
|---|---|---|---|
| 4,630,305 A | 12/1986 | Borth | |
| 4,725,956 A * | 2/1988 | Jenkins | 701/2 |
| 4,783,803 A | 11/1988 | Baker et al. | |
| 5,228,087 A | 7/1993 | Bickerton | |
| 5,278,911 A | 1/1994 | Bickerton | |
| 5,774,841 A | 6/1998 | Salazar et al. | |
| 5,809,269 A | 9/1998 | Favot et al. | |
| 5,926,790 A | 7/1999 | Wright | |
| 6,101,468 A | 8/2000 | Gould et al. | |
| 6,125,341 A | 9/2000 | Raud et al. | |
| 6,128,594 A | 10/2000 | Gulli et al. | |
| 6,859,773 B2 | 2/2005 | Breton | |

(Continued)

FOREIGN PATENT DOCUMENTS

EP    0240330 A2    10/1987

(Continued)

OTHER PUBLICATIONS

Chen, Sub-Band Based Additive Noise Removal for Robust Speech Recognition, Eurospeech, 2001—Sandinavia.

(Continued)

*Primary Examiner*—Michael N Opsasnick
(74) *Attorney, Agent, or Firm*—Bracewell & Giuliani LLP

(57) ABSTRACT

A speech activated control system for controlling aerial vehicle components, program product, and associated methods are provided. The system can include a host processor adapted to develop speech recognition models and to provide speech command recognition. The host processor can be positioned in communication with a database for storing and retrieving speech recognition models. The system can include an avionic computer in communication with the host processor and adapted to provide command function management, a display and control processor in communication with the avionic computer adapted to provide a user interface between a user and the avionic computer, and a data interface positioned in communication with the avionic computer and the host processor provided to divorce speech command recognition functionality from vehicle or aircraft-related speech-command functionality. The system can also include speech actuated command program product at least partially stored in the memory of the host processor and adapted to provide the speech recognition model training and speech recognition model recognition functionality.

31 Claims, 15 Drawing Sheets

U.S. PATENT DOCUMENTS

| | | | |
|---|---|---|---|
| 6,868,378 | B1 | 3/2005 | Breton |
| 6,922,670 | B2* | 7/2005 | Yamada et al. ............ 704/270.1 |
| 7,254,539 | B2* | 8/2007 | Carberry et al. ............ 704/257 |
| 7,328,147 | B2* | 2/2008 | Wang et al. ..................... 704/9 |
| 7,349,825 | B1* | 3/2008 | Williams et al. ............ 702/182 |
| 7,415,326 | B2* | 8/2008 | Komer et al. ................... 701/3 |
| 7,529,657 | B2* | 5/2009 | Wang et al. ..................... 704/9 |
| 7,548,847 | B2* | 6/2009 | Acero et al. .................... 704/9 |
| 2002/0055844 | A1 | 5/2002 | L'Esperance |
| 2002/0087319 | A1 | 7/2002 | Stephenson |
| 2002/0116196 | A1 | 8/2002 | Tran |
| 2002/0156629 | A1* | 10/2002 | Carberry et al. ............. 704/257 |
| 2003/0006910 | A1* | 1/2003 | Dame ........................ 340/945 |
| 2003/0088412 | A1* | 5/2003 | Shetty et al. ................ 704/243 |
| 2004/0020797 | A1* | 2/2004 | Fontana ...................... 206/219 |
| 2004/0020809 | A1* | 2/2004 | Allan et al. ................. 206/371 |
| 2004/0117275 | A1* | 6/2004 | Billera ......................... 705/28 |
| 2004/0124998 | A1* | 7/2004 | Dame ........................ 340/945 |
| 2004/0199374 | A1* | 10/2004 | Wang et al. ..................... 704/4 |
| 2006/0028337 | A1 | 2/2006 | Li |
| 2006/0069547 | A1* | 3/2006 | Wang et al. ................... 704/10 |
| 2006/0074631 | A1* | 4/2006 | Wang et al. ..................... 704/9 |
| 2007/0061148 | A1* | 3/2007 | Cross et al. ................. 704/275 |
| 2007/0288128 | A1* | 12/2007 | Komer et al. ................... 701/3 |
| 2007/0288129 | A1* | 12/2007 | Komer et al. ................... 701/3 |
| 2007/0288242 | A1* | 12/2007 | Spengler et al. ............. 704/275 |
| 2008/0125933 | A1* | 5/2008 | Williams et al. ............... 701/30 |
| 2008/0201148 | A1* | 8/2008 | Desrochers ................. 704/257 |
| 2009/0065275 | A1* | 3/2009 | Akimoto et al. .......... 180/65.28 |
| 2009/0083034 | A1* | 3/2009 | Hernandez et al. .......... 704/251 |

FOREIGN PATENT DOCUMENTS

| | | |
|---|---|---|
| EP | 1557822 A1 | 7/2005 |
| EP | 1591979 A1 | 11/2005 |
| EP | 1209662 B1 | 7/2007 |
| WO | WO 9812685 A1 | 3/1998 |

OTHER PUBLICATIONS

Lynch, AFARR: A Framework for Automatic Speech Recognition, Thesis, University of New Hampshire, Sep. 2003.

M. Berouti, et al, "Enhancement of Speech Corrupted by Acoustic Noise," IEEE International Conference on Acoustics, Speech & Signal Processing (CASSP), Washington, US, 1979, pp. 201-211.

D. Genoud, et al., "Combining Methods to Improve Speaker Verification Decision," IEEE International Conference on Spoken Language Processing (ICSLP), Philadelphia, PA, USA, 1996, pp. 1756-1759.

* cited by examiner

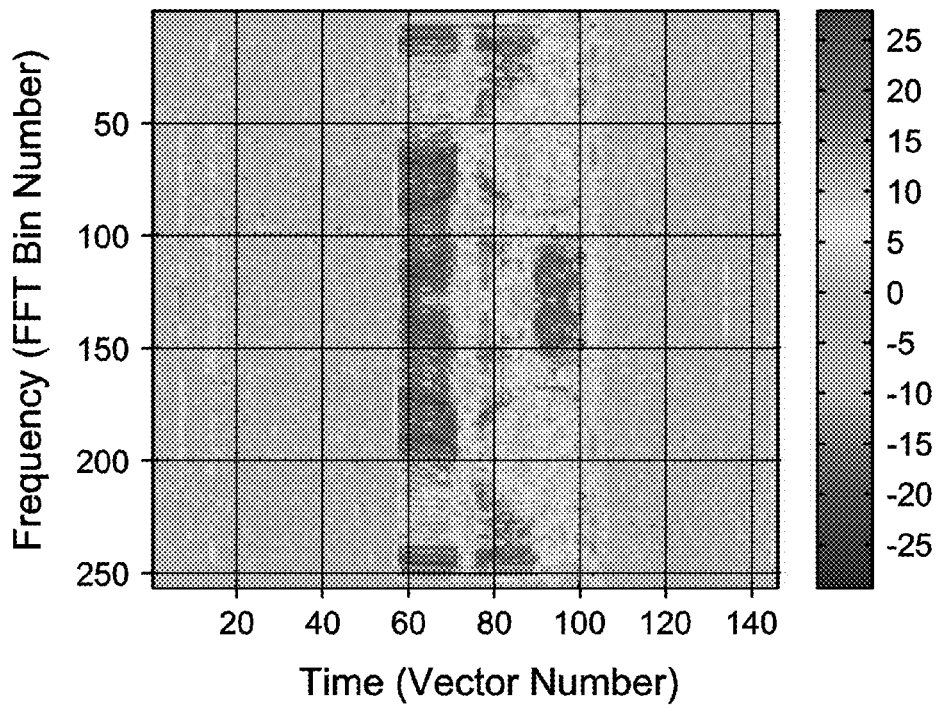
Fig. 9  Equalized STFT
Short Time Fourier Transform after Equalization
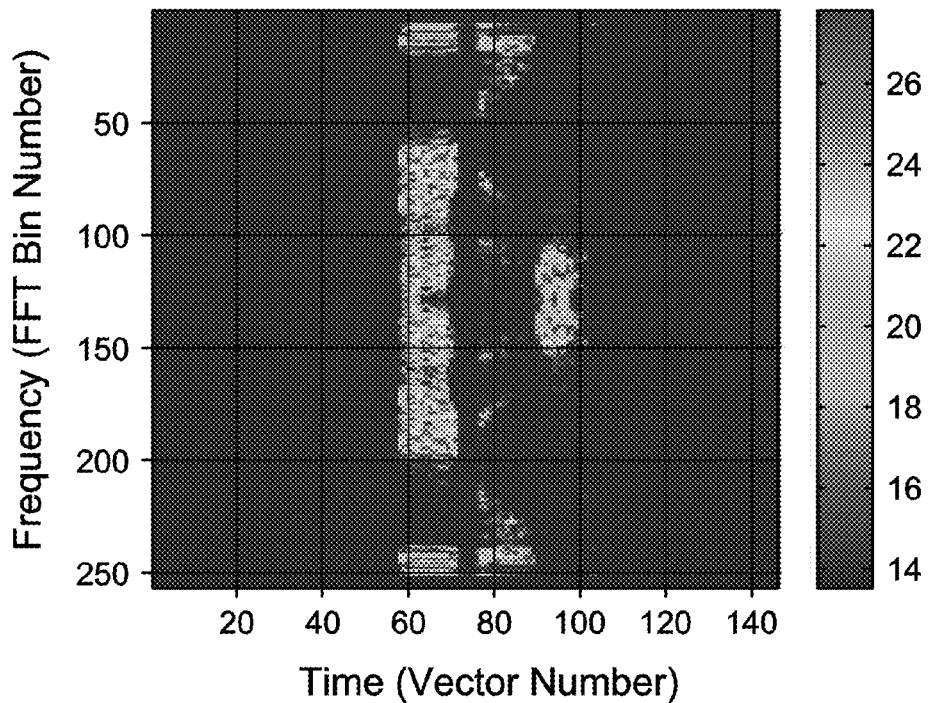
Fig. 10  Thesholded STFT
Short Time Fourier Transform after Thresholding Fig. 11   Restored STFT
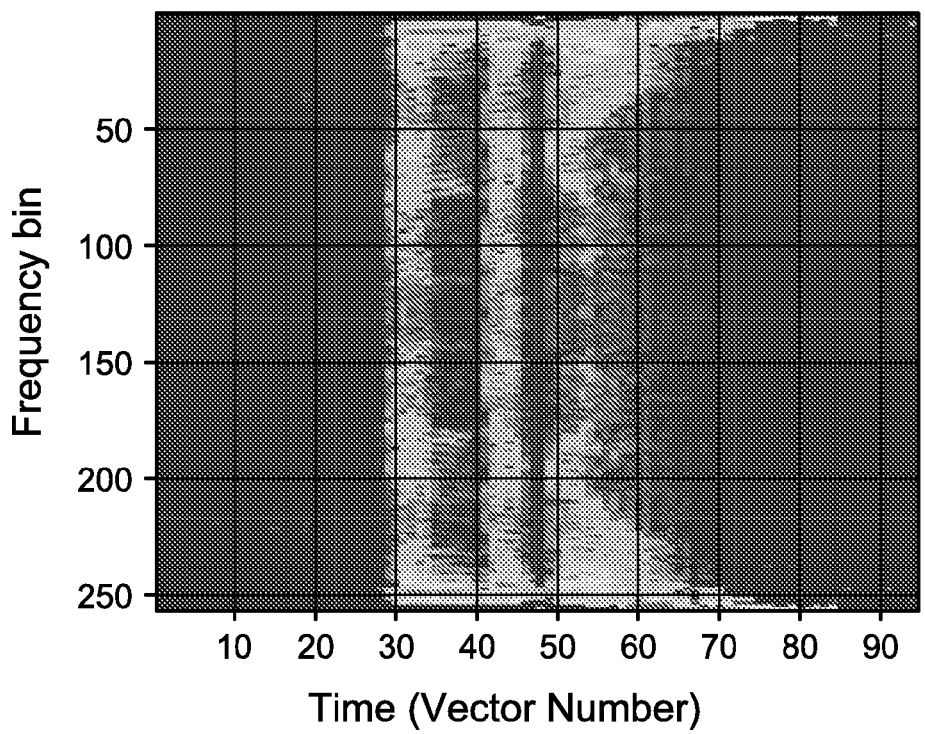
Fig. 12   Waveform After Noise Removal
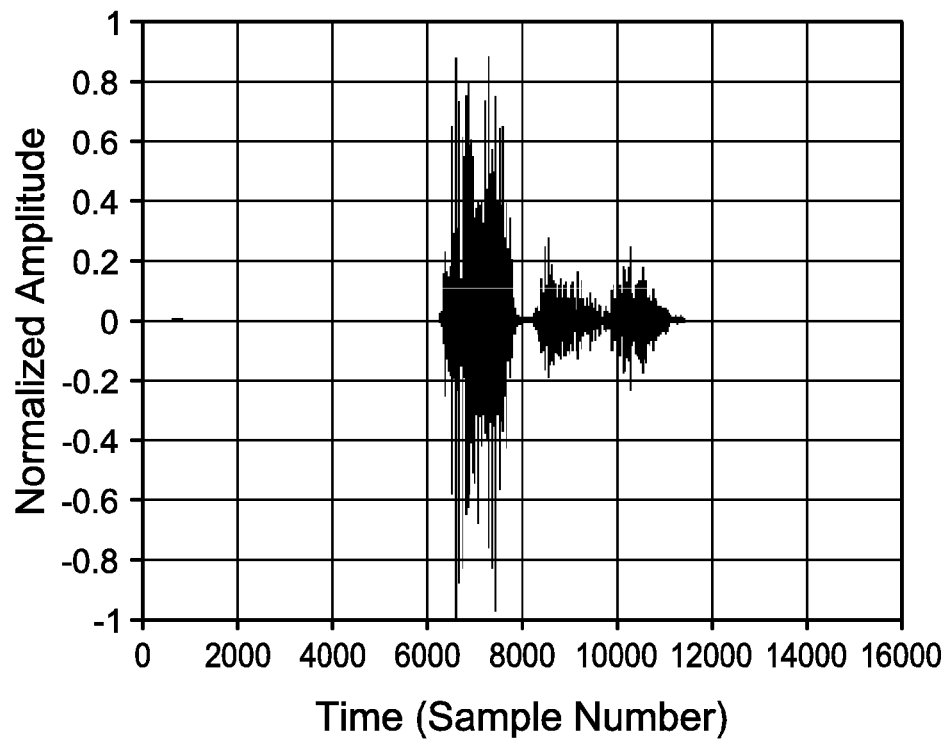

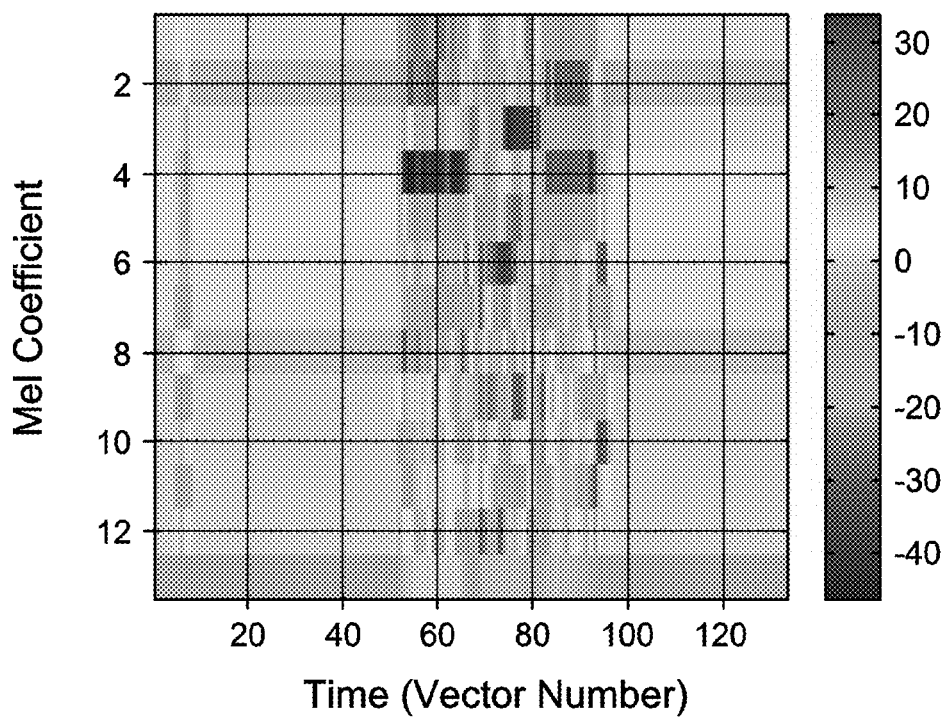
Fig. 13 Mel Cepstrum
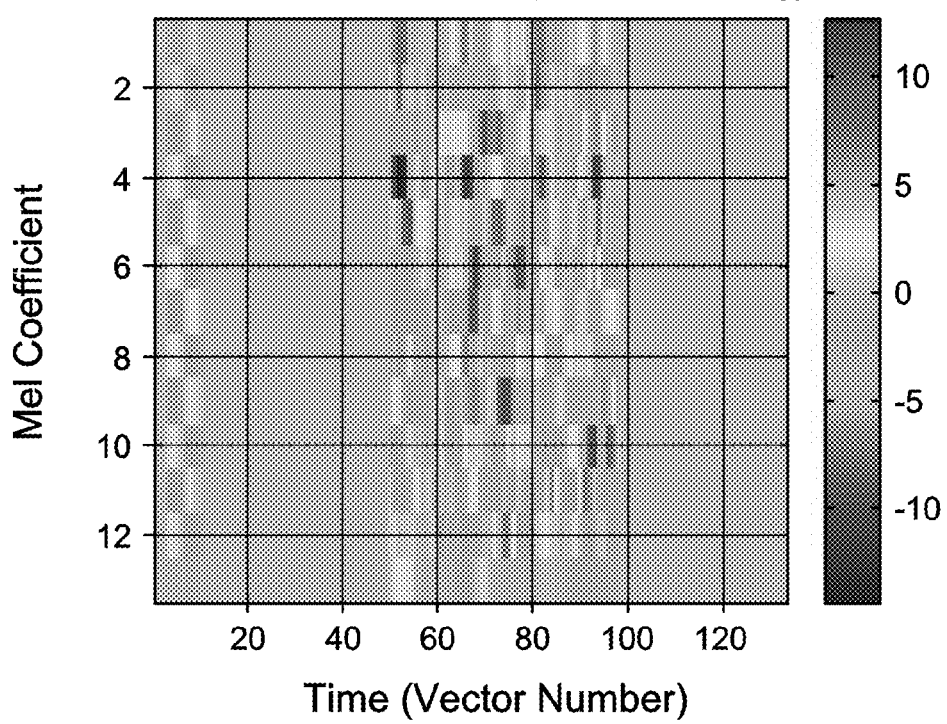
Fig. 14 Derivative of Mel Cepstrum

Fig. 15 Second Derivative of Mel Cepstrum
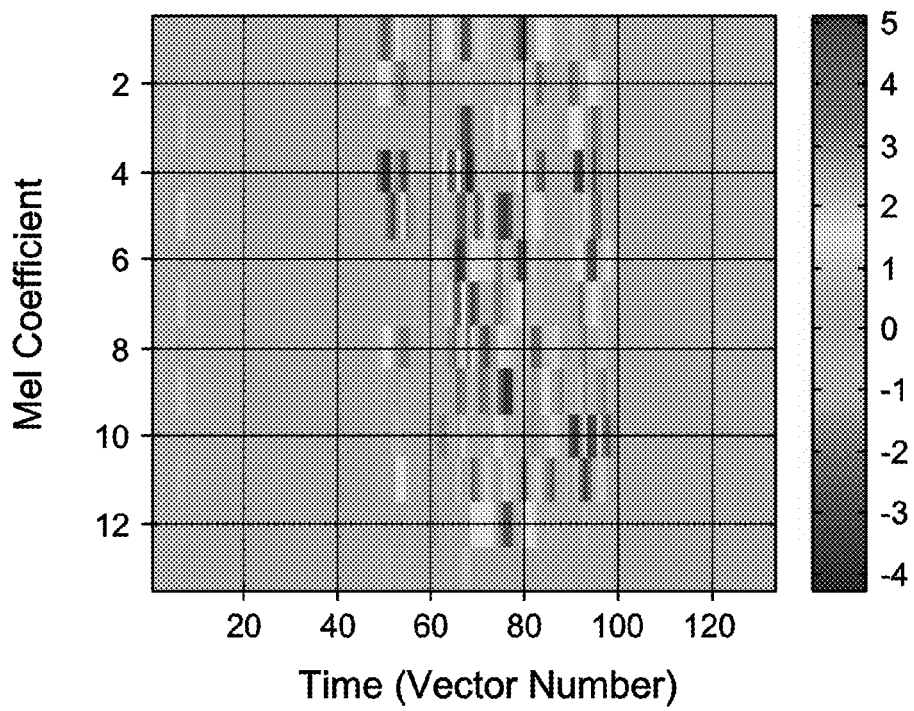
Fig. 17 HMM Mean
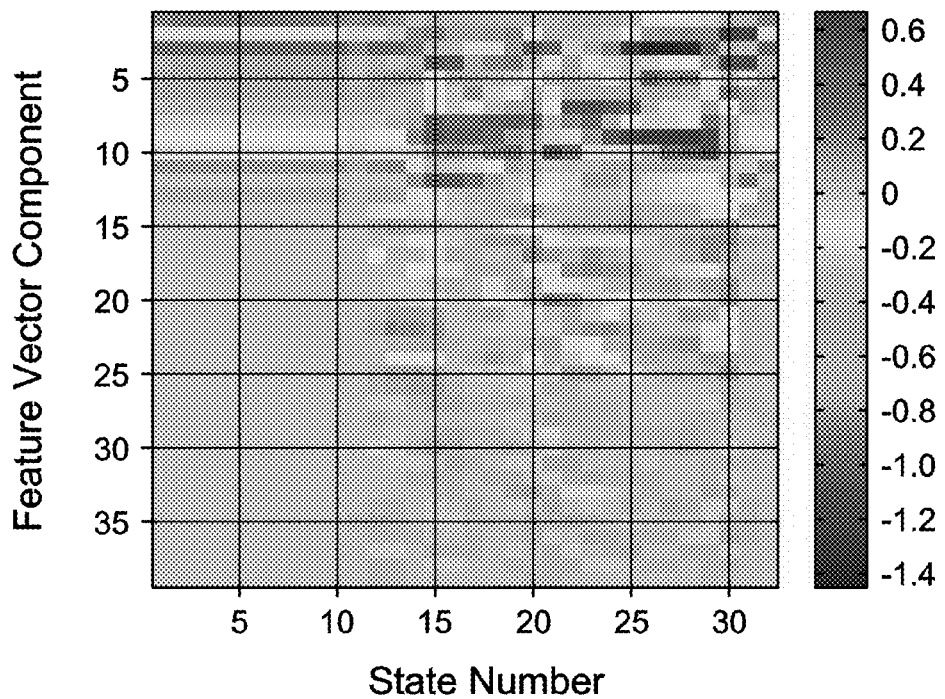

Fig. 18   HMM Variance
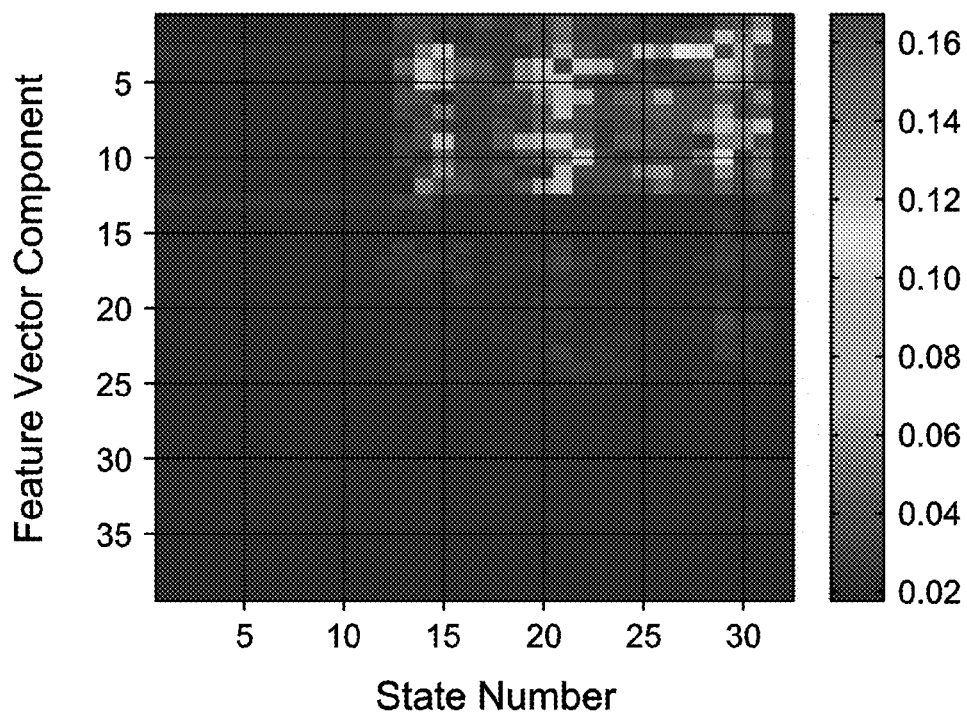
Fig. 19   HMM State Transition Matrix
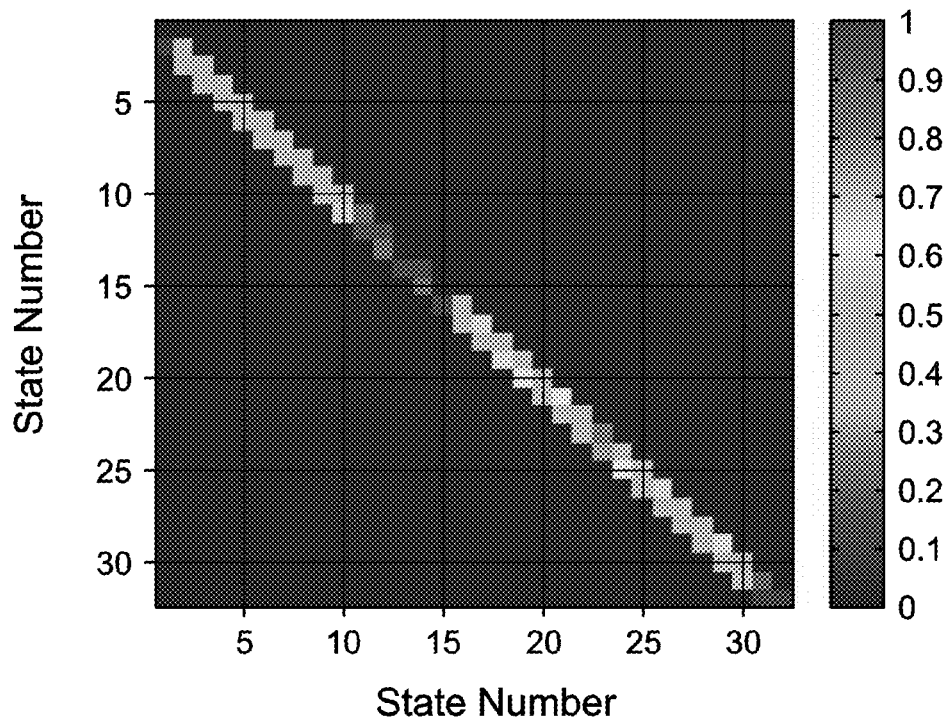

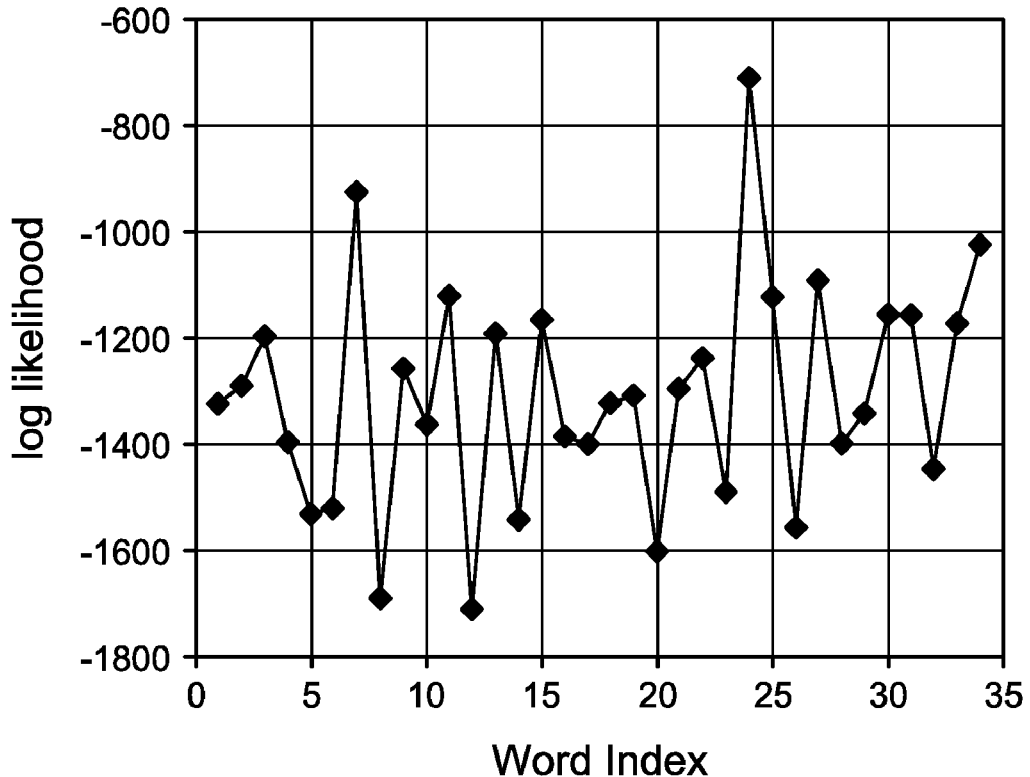
Fig. 20  Log Likelihood
Fig. 21  Score Calculation
$$\text{Score} = \frac{\exp\{-\log\_like(1) / \log\_like(2)\}}{\exp\{-1\}} - 1$$
$$\text{Score} = \frac{\exp\{=710/925\}}{\exp\{-1\}} - 1 = 0.262$$

Fig. 22

| Function Class | Functions | Description |
|---|---|---|
| Configuration | get_configuration | Retrieve current set of parameters |
| | Initializaton | Set recognition parameters within algorithms |
| | load_configuration | Load parameters from file |
| Training | train_word | Adds training instance for word within dictionary |
| | untrain_word | Removes last training instance for word within dictionary |
| | train | Generates HMM models for words with new training instances |
| | clear_word | Clears particular word from dictionary |
| | clear_all | Clears all words from dictionary |
| | list_words | Lists number of training instances for words within dictionary |
| Recognition | recognize | Performs word recognition |
| Template Control | save_template | Saves parameters and HMM models to file |
| | restore_template | Loads parameters and HMM models from file |
| Integrity Checks | get_clipped | Determines whether word exceeds input dynamic range |
| | get_cropped | Determines whether word is cropped |
| | get_misaligned | Determines whether enough samples available for noise removal |
| | get_quiet | Determines whether word is low in volume |
| | get_integrity | Gets results for all of the integrity checks |

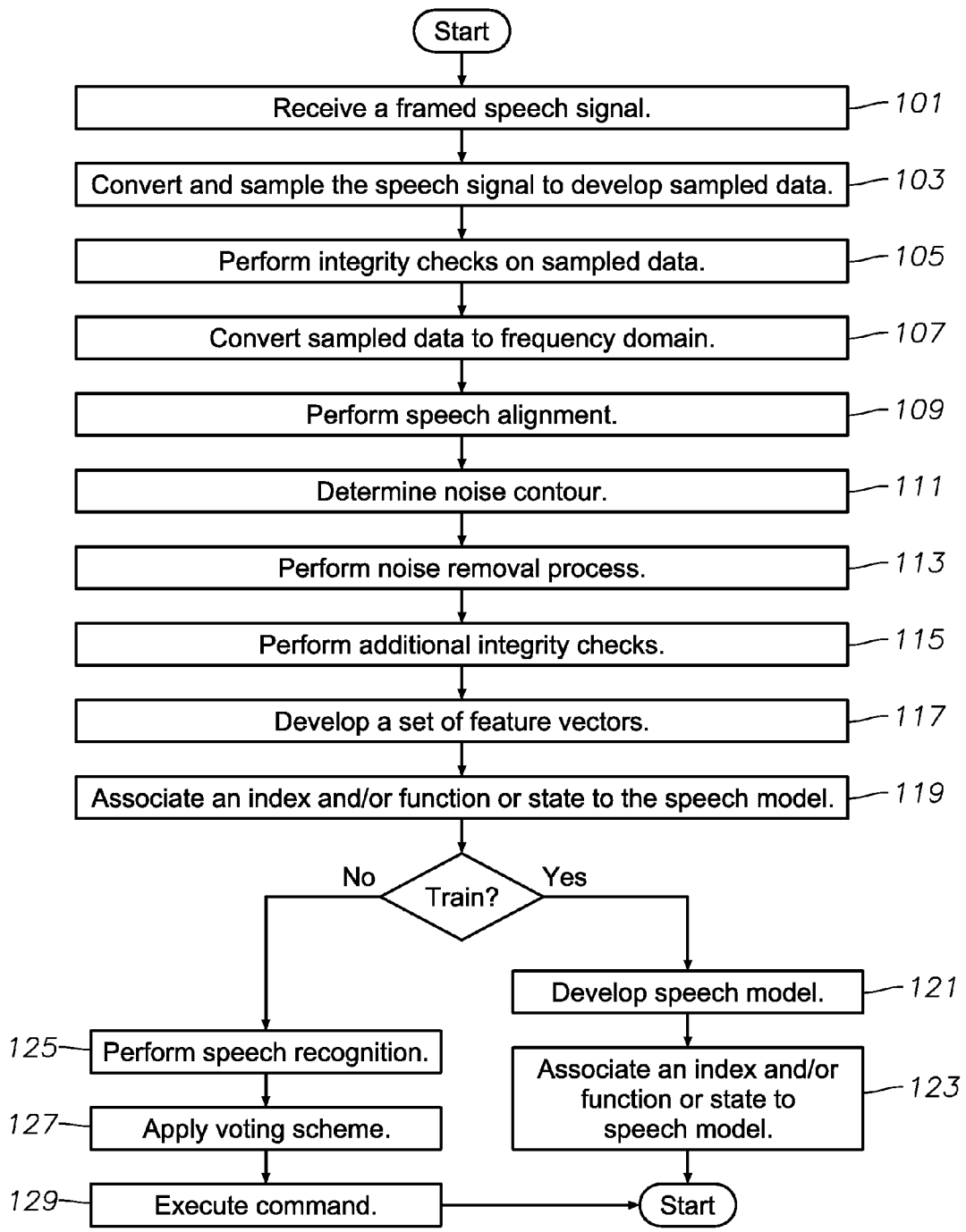

Fig. 25

| Item | Data |
|---|---|
| A. | Push-to-talk signal |
| B. | Spoken command from pilot |
| C. | Audio feedback to pilot |
| Ca. | Status, ready-to-learn |
| Cb. | Status, ready-to-listen |
| Cc. | Status, error, say again |
| Cd. | Status, transaction done |
| D. | Digitized user-speech-template |
| E. | Function identification (ID) number |
| Ea. | Training Index # |
| Eb. | Listening (Recognition) Index # |
| F. | Mode: T = train; R = recognize E = erase |
| G. | Integrity score (grades quality of pilot annunciation) |
| H. | Engine selection (HMM, NN, or other), as desired |
| I. | Repeat request to pilot as needed per item G or item L |
| J. | Display-format & avionic system commands per function definition |
| K. | Function definition |
| L. | Recognition confidence score |
| M. | Rejection threshold |

SPEECH ACTIVATED CONTROL SYSTEM AND RELATED METHODS

BACKGROUND OF THE INVENTION

1. Field of the Invention

The present invention relates generally to control systems. More specifically, the present invention relates to a system, program product, and related methods to provide speech-activated control of vehicle components.

2. Description of the Related Art

Systems capable of responding to or obeying human commands have been begun to appear over the last decade or so. Such systems have attempted to increase the speed and ease with which humans can communicate with machines. Due to recent developments in computer hardware and software technology as well as recent advances in the development of algorithms for the recognition of speech, speech recognition systems have become more powerful, and therefore, more useful for interfacing a user with complex equipment having multiple functions to be able to control equipment by spoken commands. Speech recognition systems have also been used in control systems for controlling remotely piloted vehicles. In such systems, spoken commands are converted into a machine compatible control signal used to open or close solid-state switches. The control signal is transmitted to the aircraft to manipulate a switch which activates a servo that drives a selected control surface or manipulates a throttle setting.

Speech recognition systems generally operate by matching an acoustic signature of a word to be recognized against an acoustic signature of words previously stored in a vocabulary database. A microphone first converts the acoustic signature of the uttered word into an electrical signal. An A/D converter converts the electrical signal into a digital representation of the successive amplitudes of the audio signal created by the utterance. The signal is converted from the time domain to the frequency domain which gives the amplitude of the signal in each of a plurality of frequencies over time. Such acoustic signature can be visualized through display on a spectrogram, a three-dimensional graph which plots frequency along the vertical axis, time along the horizontal axis, and the intensity of the sound at any given frequency and time by degree of coloration. Generally, as part of the speech recognition process, the unknown word is broken down into its spectral components and the amplitude or intensity of the acoustic signature at various frequencies and temporal locations is then compared to that of the acoustic model of each word previously stored in a vocabulary database.

The speech recognition systems use various types of algorithms or speech engines to perform the speech recognition process. Pattern matching algorithms can include, for example, an asymmetric dynamic time warping algorithm and a Hidden Semi-Markov Model algorithm (HSMM), which can use dynamic time warping templates and Markov models, respectively, for each word stored in an associated vocabulary as a result of speech recognition pre-training. A Neural Net algorithm, e.g., single or multi-layer perception model algorithm, can also be used. Neural Net algorithms are typically arranged to learn features of each word, which discriminate the word from the other words in the vocabulary which is typically previously established by multiple training repetitions of the same word. That is, programming of the speech recognition system is achieved during a training or learning phase by uttering a list of words or phrases to be parameterized or otherwise broken down into spectral components and stored as spectral-temporal word models or templates in a vocabulary database. Such speech recognition systems can use pattern recognition, performing a parameterization followed by calculating a distance between spectral parameters resulting from the parameterization and the parameters associated with the words stored in the vocabulary database.

The performance of speech recognition systems tends to deteriorate significantly as the size of the vocabulary database to be searched to perform the speech recognition increases. As the size of the vocabulary database grows, there is an increased probability that a word from the vocabulary will be misrecognized as another similar sounding word. In some speech recognition systems, in order to limit the size of the vocabulary database to be searched, the speech engine can limit its search to a subset of the words stored in the vocabulary database. Such systems can include provisions for the user to provide a spoken transitional command to select a working syntax on the basis of the type of and alterations in the operational profile of the vehicle. Such systems, however, can be problematic in that misinterpretation of the spoken transitional command by the speech recognition engine or delivery of an incorrect transitional command by a user can result in attempting to recognize an utterance using an incorrect vocabulary database subset.

Determining exactly when an utterance has begun can also be problematic, especially when the acoustic signal includes high background noise content. One such system which can determine the temporal location of the beginning of the word to be recognized compares parameters of the acoustic signal to an acoustic model of the background noise to locate the beginning of the word.

Prior speech recognition systems, nevertheless, have generally not met user expectations. Such speech recognition systems require the speech engine or engines to be pre-trained for specific vocabulary and syntax sequences which are embedded in the speech engine for correlation with a pre-determined aircraft control function. Conversely, traditional uses of speech recognition with operational aircraft or at control station interfaces require a pre-determination of selected functions and their associated speech command vocabulary and/or syntax. That is, when implemented to be used with aircraft or control station interfaces for unmanned aerial vehicles, predetermined functions must be selected and associated with specific speech command vocabulary words and/or syntax prior to installation or operational use. Thus, such systems are not adaptable in real-time to an ever-changing operational environment.

When used with aircraft in-operation or control station interfaces, it is desirable, for example, to provide the user feedback as to whether or not the attempted recognition is correct and to provide the user the ability to readily correct the command if the attempted recognition is incorrect. Some systems provide the user a visual display or audio "repeat back" the system's understanding of the word or words which have been spoken. Such system can also require the user to confirm that the commands recognized are correct, either by saying an acceptance word, such as, for example, the word "yes," or by pressing a keyboard key or other switch. Such systems place a considerable burden on the user by requiring him or her to confirm the system recognition, whether or not correct.

Recognized by the Applicants is the need for a speech actuated control system that, within a pre-approved domain of cockpit or control station command functionality, can enable the user, i.e., pilot or control station operator, in real time during flight, to select and record one or more command functions or system states of choice; select, record and command-associate an annunciation of choice; train the speech engine to recognize the selected annunciation; and execute the selected function via a speech command using its associated annunciation. Also recognized is the need for a speech engine to aircraft or control station interface which can enable the functionality chosen for a speech command to be associated therewith to be totally transparent to the speech engine, and that includes the capability to enable user selection of speech command functionality in real time. Also, recognized by the Applicants is the need for a speech actuated control system that can provide language independence, i.e., is not tied to any specific language.

SUMMARY OF THE INVENTION

In view of the foregoing, embodiments of the present invention advantageously provide a speech-activated control system for controlling aerial vehicle components including program product which can provide a unique noise removal process and a unique speech integrity reassurance process along with having unique components or modules which together provide extremely high recognition accuracy as high as 100 percent even in an extremely harsh noise environments. Embodiments of the system allow the user to select or build his or her own function library and associated command vocabulary, isolating the speech engine from changes to the vehicle mechanization. Embodiments of the system also provide for recognition of sounds (components of an utterance) rather than words, making the associated vocabulary template language independent of any known language and negating any need for a vocabulary template having pre-stored models. Thus, there is also no need to change templates if the same user chooses to speak a different language. Embodiments of the system can control pilot-programmed, soft-key cockpit-switched macros which can allow for automated initiation of a predefined aircraft system state or preselected and/or scripted operational configuration.

Specifically, embodiments of the present invention provide speech activated control systems for controlling aerial vehicle components. For example, a system can include a host processor adapted to develop speech recognition models and to provide speech command recognition. The host processor can be positioned in communication with a database for storing and retrieving speech recognition models. The system can also include an avionic computer in communication with the host processor and adapted to provide command function management, a display and control processor in communication with the avionic computer adapted to provide a user interface between a user and the avionic computer, and a data interface positioned in communication with the avionic computer and the host processor to divorce speech command recognition functionality from vehicle or aircraft-related speech-command functionality. The system can also include a mobile storage device interface in communication with the database to allow an operator or user to remove and load previously developed speech recognition models, associated index numbers, and associated functions or vehicle system states.

The system can further include speech actuated command program product at least partially stored in the memory of the host processor and including instructions that when executed by the host processor perform the operations of forming a digitized user-speech template, thresholding bins of equalized portions of the digitized user-speech template representing a command annunciation to remove noise from within and around speech formants of the sampled speech data, developing a set of feature vectors representing energy of a frequency content of the digitized user-speech template to thereby determine a unique pattern identifying the command annunciation, applying a speech recognition engine to the set of feature vectors to form at least one speech recognition model associated with the command annunciation, associating an index with the at least one speech recognition model associated with the command annunciation, and storing the at least one speech recognition model and the assigned index. The instructions can also include those to perform the recognition operations of receiving the command associated annunciation real-time in-flight indicating a request for recognition, returning the index associated with a stored model determined to match the command annunciation, returning a confidence score indicating likelihood the match is correct, and executing an assigned function or forming an assigned state when the confidence score is above a preselected or selected threshold value.

Embodiments of the present invention include a method to provide speech-activated control of aerial vehicle components. For example, a method can include the steps of sampling a speech signal representing speech to define sampled data, performing an integrity check on the sampled data to identify when the speech is below a preselected standard, aligning the sampled data in an observation window to enhance analysis of the speech, thresholding bins of equalized portions of the sampled data to remove noise from within and around speech formants, developing a set of feature vectors representing energy of a frequency content of the sampled data to thereby determine a unique pattern, applying a speech recognition engine to the set of feature vectors to form at least one speech recognition model associated with the speech signal, and during speech training, assigning an index to the at least one speech recognition model associated with the speech, and storing the at least one speech recognition model and the assigned index. When performing speech recognition, the method correspondingly includes the steps of returning the index associated with a stored model determined to match sampled data, returning the confidence score indicating likelihood the match is correct, and executing an assigned function or forming an assigned state when the confidence score is above a preselected or selected threshold value.

Embodiments of the present invention provide a system, program product, and methods that can be particularly useful where the user, e.g., pilot or control station controller, does not wish to release his or her hands from the controls to operate multiple ancillary mechanical switches and other controls. Embodiments of the present invention provide a multi-dimensional classifier based upon Hidden Markov Models and Neural Networks. Such embodiments provide for real-time creation of what may be termed a speech-activated switch macro, which is beyond the capabilities believed to exist for current cockpit or control station speech recognition approaches which require predetermination of both applicable control functions and their related vocabulary/syntax, each of which must be made available for incorporation as part of their system design. Additionally, multiple vocabulary templates can be created and associated with different operational profiles, a different speaker or user. Each template can have a very small vocabulary size to allow for improved speech performance over prior systems which require a single large vocabulary database. Also, each separate vocabulary template can have a different parameterized value used in noise removal to reflect the varying expected noise associated with each different operational profile. Embodiments of the present invention provide a simple high level interface for training, recognition, and loading/storing the templates, and provide for easy avionics system integration. Embodiments of the present invention also allow real-time cockpit enrollment, i.e., all training of speech actuated commands completed in-flight.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 9 is an equalized image of the spectrogram of FIG. 6 according to an embodiment of the present invention;

FIG. 10 is an equalized thresholded image of the spectrogram of FIG. 9 according to an embodiment of the present invention;

FIG. 11 is a spectrogram of the input waveform of FIG. 5 after noise removal according to an embodiment of the present invention;

FIG. 12 is a graph of the input waveform of FIG. 5 after noise removal according to an embodiment of the present invention;

FIG. 13 is a Mel Cepstrum graph of the input waveform of FIG. 5 after noise removal according to an embodiment of the present invention;

FIG. 14 is a graph of a first derivative of the Mel Cepstrum of FIG. 13 according to an embodiment of the present invention;

FIG. 15 is a graph of a second derivative of the Mel Cepstrum of FIG. 13 according to an embodiment of the present invention;

FIG. 17 is a graph of the mean for a Hidden Markov Model of the input signal of FIG. 5 after noise removal according to an embodiment of the present invention;

FIG. 18 is a graph of the variance for a Hidden Markov Model of the input signal of FIG. 5 after noise removal according to an embodiment of the present invention;

FIG. 19 is a graph of a state transition matrix for a Hidden Markov Model of the input signal of FIG. 5 after noise removal according to an embodiment of the present invention;

FIG. 20 is a graph illustrating likelihood of each of a plurality of indexed utterances matching the speech component of the input signal of FIG. 5 according to an embodiment of the present invention;

FIG. 21 is a mathematical illustration of a likelihood score calculation comparing the most likely utterance to the second most likely utterance according to an embodiment of the present invention;

FIG. 22 is a table showing representative functions of the speech actuated command program product of FIG. 2 according to an embodiment of the present invention;

FIG. 23 is a flowchart illustrating a method of training and recognizing an utterance according to an embodiment of the present invention;

FIG. 25 is a table illustrating the definition of symbols used in the dataflow illustration of FIG. 24 according to an embodiment of the present invention.

DETAILED DESCRIPTION

Figure 1:
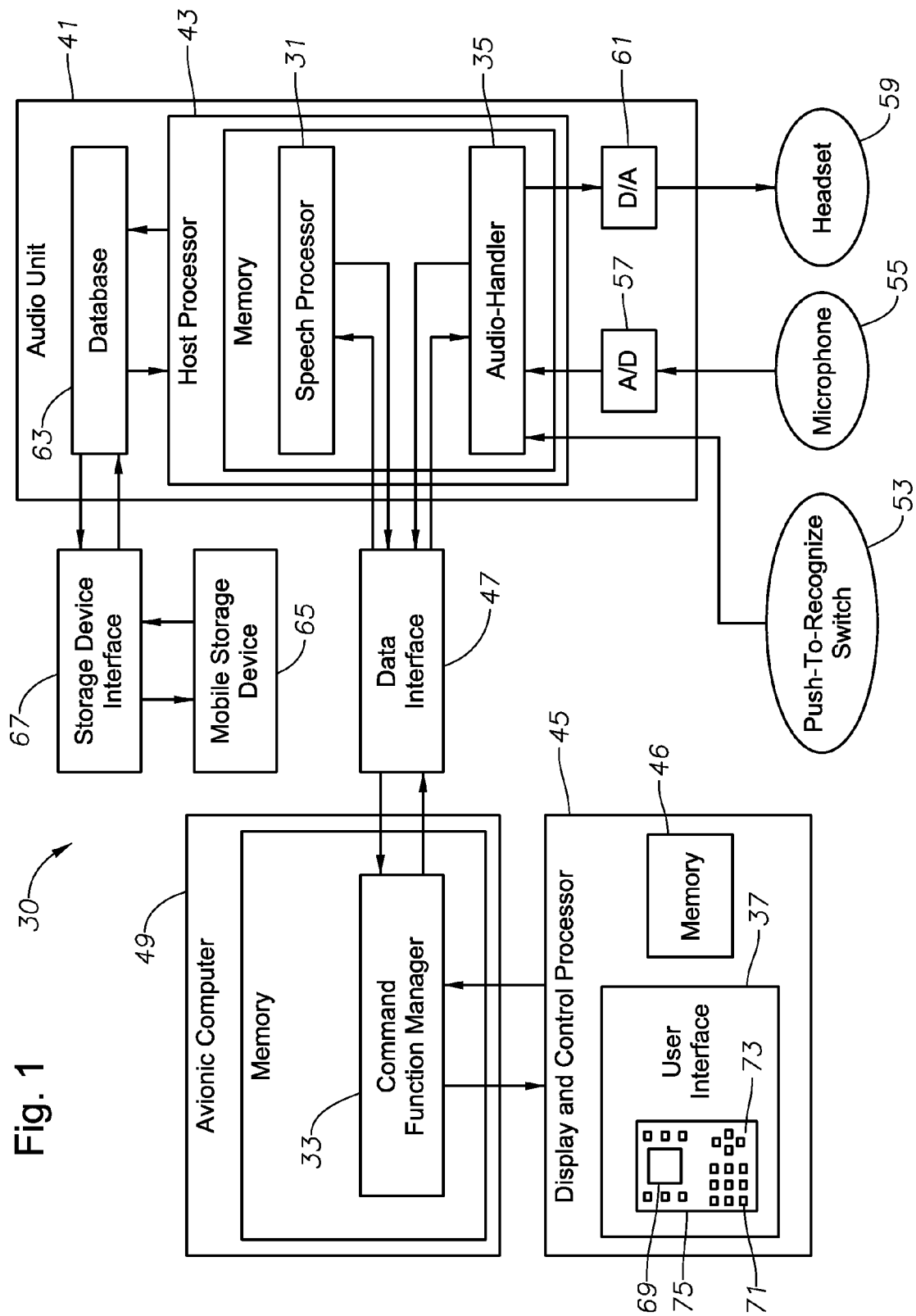
FIG. 1 is a schematic block diagram of a general system architecture of a system for controlling aerial vehicle components according to an embodiment of the present invention.
Figure 2:
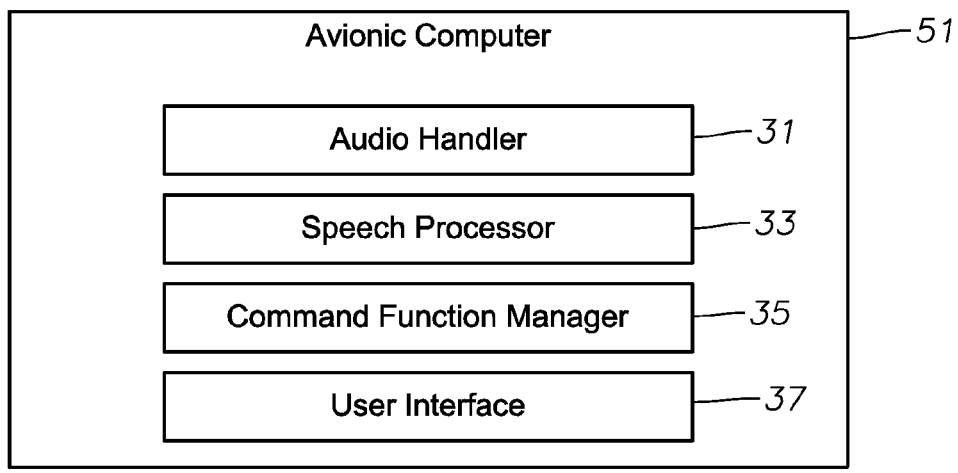
FIG. 2 is a schematic block diagram of a speech actuated command program product according to an embodiment of the present invention.

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

As illustrated in FIGS. 1-25, embodiments of the present invention provide a speech activated control system 30 for controlling aerial vehicle components. In general, to provide an innovative speech-command-capability designed to meet the unique requirements of, e.g., cockpits, unmanned aerial vehicle (UAV) control-stations, or other human-vehicle type interfaces, embodiments of the system 30 combine four major software/program product components: a speech recognizer 31, a speech recognizer-to-aircraft or control interface 33, a user audio handler 35, and a user interface 37. As a brief overview of general concepts embodied in the preferred embodiment of the present invention, in order to provide extremely high recognition accuracy even in an extremely harsh noise environment, the speech recognizer 31 can first perform noise removal and equalization. Data representing received speech or a command annunciation (including a noise component) is subjected to an integrity check and is pre-aligned using a convolution-based algorithm. Background noise estimates are acquired in each spectral bin (described later). Signals are then thresholded based on the noise estimates and the spectrum is adjusted based on acquired response characteristics. A parameterized feature extraction process is employed in which a Short-Time Fourier analysis, for example, is used to produce either an associated spectrum or a cepstrum. The cepstrum involves applying additional nonlinear processing to the spectrum and another transform back to a quasi-time domain feature space. Post-feature processing can be applied to the signal in which cropping and/or clipping effects can be identified and/or corrected. Severe cropping or clipping, especially during training, are to be detected so that when detected, the utterance is prevented from being applied to form recognition models to thereby ensure integrity of models produced as a result of the training. Hidden Markov Model ("HMM") and Neural Network ("NN") speech recognition engines or classifiers can be provided as part of a multiple speech engine concept. This multiple speech engine concept can improve the performance beyond what could be accomplished with a single classifier. A configuration-based template approach allows for additional independent models to be specified merely by changing the feature extraction and training parameters or by changing the training data. The output from the speech engine stages can be processed by answer determination voting logic, which can combine scores between the individual speech engines to be used to make decisions for rejection thresholding, i.e., determining when to ask the speaker to repeat an utterance.

More specifically, as shown in FIG. 1, according to an embodiment of the present invention, the system 30 includes an audio unit 41 including a host processor 43 in communication with a display and control processor 45 through a data interface 47 and an avionic computer 49. The system 30 can also include a speech actuated command program product 51 (FIG. 2) which can incorporate the speech recognizer 31, command function manager 33, audio handler 35, and the user interface 37. The system 30 also includes a push-to-recognize mechanism or switch 53, an audio input device, e.g., microphone 55, an analog-to-digital converter 57 which provides an interface between the microphone 55 and the audio-handler 35, an audio output device, e.g., headset or speaker(s) 59, and a digital-to-analog converter 61 which provides an interface between the audio-handler 35 and the headset or speaker(s) 59. The system 30 also includes a database 63 for storing speech template/models and associated index numbers and/or functions/vehicle system states.

The system 30 also includes a mobile storage device 65 and mobile storage device interface 67 to allow the operator to save, remove, and load the speech template or models and associated index numbers and save, remove, and load associated functions and vehicle system states; or, according to an alternative embodiment, load pre-trained mission-specific templates or models and load predefined functions and vehicle system states. Each of a plurality of speech template or model groups, for example, of up to, e.g., 50 or so command annunciations, can be associated with a different operational profile which can have an associated parameterized value (determined through experimentation) to coincide with an associated noise removal, described in more detail later.

The host processor 43 can include memory and a portion of the speech actuated command program product 51 including the speech recognizer 31 and the audio handler 35. The speech recognizer 31, described in more detail below, can provide most of the major functions including noise removal, feature extraction, or alignment, speech training, and command annunciation recognition. The audio handler 35 receives a digitized speech signal from the microphone 55 and analog-to-digital converter 57 to produce a digitized user-speech template for use by the speech recognizer 31.

The display and control processor 45 can include memory 46 and a portion of the speech actuated command program product 51 defining the software or program product portion of the user interface 37 and can also include a video display 69 and user input device or devices that engage program-specific functions, e.g., standard hard-linked alpha-numeric and scroll arrow keys 71, 73, and "soft keys" 75 typically positioned adjacent the display 69 defining at least some of the hardware portion of the user interface 37. The user interface 37 can be used to receive a selected mode flag and a function/system state provided or otherwise inputted by the user. When implemented in an aircraft within a preselected domain, the user interface 37 can enable a user to select and record one or more command functions or system states of choice; select, record, and command-associate a command annunciation of choice; train the speech recognizer 31 to recognize the selected annunciation; and execute the selected function via a speech command using its associated annunciation, all in real time during flight. According to an embodiment of the present invention, the user interface 37 can function using a format that is somewhat similar in concept to that used with cellular or mobile telephones. In such telephone systems, the telephone user enters a telephone number and then annunciates a name of choice for that number. At a later time, the telephone user speaks the selected name which causes the telephone to dial the associated number.

According to one particular instantiation of this approach called the speech activated switch macro, the pilot can record a series of switch hits (actuations) and assign a name of choice to that sequence of switch actuations (i.e. switch macro). Upon recognition of the respective spoken command, the system 30 executes the macro. For example, the pilot can preselect avionic and navigation radios and/or pilot-assist devices to perform, e.g., a non precision approach to a selected runway, by assigning such configuration to a command annunciation, e.g., "Houston Runway 38," which when recognized with sufficient confidence, can be executed either automatically or through positive confirmation from the pilot.

The avionics computer 49 includes memory and can include a portion of the speech actuated command program product 51 defining the command function manager 33. The command function manager 33 can display and format avionics system commands for function definition and can pass training index numbers and function modes. The command function manager 33 can receive and process an integrity score which grades the quality of an annunciation when in a training mode. The command function manager 33 can also receive and process an integrity score, a recognition confident score, and a listening index, when in a recognition mode.

The data interface 47 can act as a bridge between the speech recognizer 31 and audio handler 35, the command function manager 33 and audio handler 35, and command function manager 33 and speech recognizer 31. For example, during speech command training, the data interface 37 can pass user-speech templates from the audio handler 35 and an accompanying identification or index number from the command function manager 33 to the speech recognizer 31. During recognition events, the data interface 47 can pass a speech template from the audio handler 35 to the speech recognizer 31 and can pass, for example, the identifier or index for the recognized command and a recognition-confidence score, to the command function manager 33 and/or user interface 37. The data interface 47 can also provide for passing user options to call a HMM and/or NN engine associated with the speech recognizer 31, which can allow for improved recognition performance by enabling comparison of identifiers and scores returned by both of the HMM and NN engines. Note, in its simplest form, the data interface 47 can be a bus. In a more complicated form, the data interface 47 can include portions of the speech actuated command program product 51. Additionally, though depicted as positioned external from the host processor 31 to illustrate an ability to divorce the speech engines from the aircraft-related speech-command functionality, the data interface can be positioned within the host processor 43 and/or within memory of the host processor 43.

The speech actuated command program product 51 can be in the form of microcode, programs, routines, and symbolic languages that provide a specific set or sets of ordered operations that control the functioning of the hardware and direct its operation, as known and understood by those skilled in the art. Further, as shown in the exemplary embodiment, the speech actuated command program product 51 need not reside on a single device but can be distributed over multiple devices. Also, portions of the speech actuated command program product 51 on any single device need not reside in volatile memory, but can be selectively loaded, as necessary, according to various methodologies as known and understood by those skilled in the art.

Embodiments of the speech actuated command program product 51 exhibit robust and fast recognition in a high noise environments, e.g., manned cockpit environment, and can provide a very small compiled footprint for use in embeddable applications, supporting multiple command sets, speakers, and languages. Significant advantages of this implementation are afforded to a target application due to the small footprint, the simple calling interface 37, and speed of the processing for both training and recognition. Other conventional speech recognition systems are on an order more complicated and larger in terms of code and executable footprints and the number of supporting applications needed. That is, according to an embodiment of the present invention, the size of the executable portion of the program product 51 is on the order of only about 50 kilobytes, requiring memory storage of about 11 MB for a 50 word/utterance vocabulary template database 63. The combination of a small executable and small vocabulary template database 63 provides a high rate of performance. For example, when implemented by a 1.6 GHz Pentium IV processor, Hidden Markov Model training on an utterance encapsulated within a 1.5 second frame can be performed in less than approximately 400 milliseconds for each word/utterance and recognition of such word/utterance (command annunciation) using a Hidden Markov Model recognition engine/classifier can be performed in less than 250 milliseconds.

Figure 3:
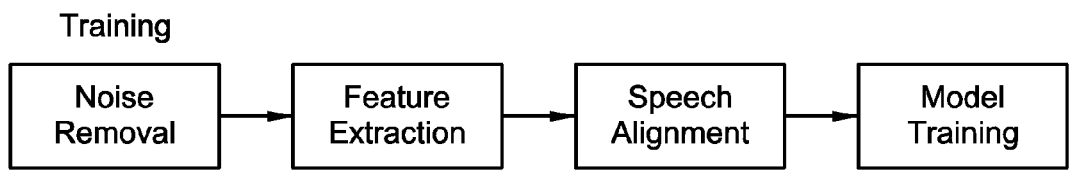
FIG. 3 is a schematic block flow diagram of high-level speech training functions according to an embodiment of the present invention.
Figure 4:
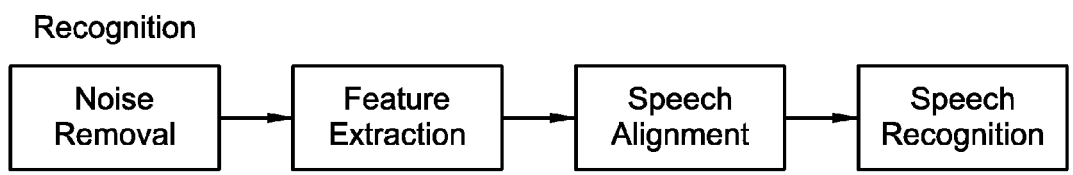
FIG. 4 is a schematic block flow diagram of high-level speech recognition functions according to an embodiment of the present invention.
Figure 5:
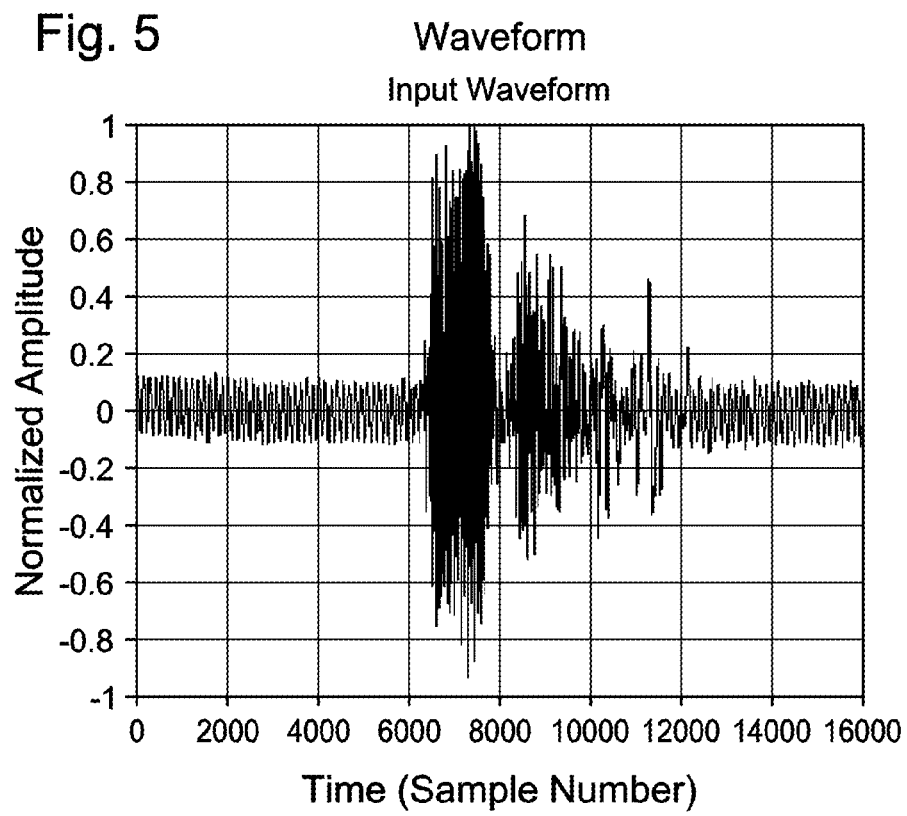
FIG. 5 is a graph of an input waveform according to an embodiment of the present invention.

As shown in FIGS. 3 and 4, the speech actuated command program product 51 can provide a train or training mode and a recognize or recognition mode. The train mode can include noise removal, feature extraction, speech alignment, and model training functions. According to an embodiment of the speech recognizer 31, the speech recognizer 31 enters the train or training mode upon receipt of a train flag. This event is followed by receipt of audio data and an associated data identification or index number. A train counter is implemented to track the progress of training a new speech/utterance. At intervals and as the train counter is incremented, the speech recognizer 31 receives additional audio data (repeated utterances) accompanied by the same index number. According to one configuration of the train counter, no limit is provided on the number of times a user can train a word model with an index tag. According to alternative configurations, either a preestablished, preselected, or user selectable count limit can be provided. Termination of the train mode can be indicated to the speech recognizer 31 by a reset train flag.

The recognize mode can include noise removal, feature extraction, speech alignment, and speech recognition functions. The speech recognizer 31 enters the recognize mode upon receipt of the recognize flag. This event is followed by the receipt of audio data in the form of a command annunciation to be recognized. The speech recognizer 31 returns the index number assigned to the spoken command annunciation trained during the earlier, respective train mode session. Termination of the recognize mode is indicated by a reset recognize flag. Each entry into the recognize mode can be limited to one recognition event. According to a preferred configuration, the command function manager 33 will default to the recognize mode unless it is set to either the train or erase modes by the user, described in more detail later.

The speech actuated command program product 51 can also provide an erase mode. The speech recognizer 31 enters the erase mode upon receipt of the erase flag. This event is followed by receipt of an index number indicating the speech model/template to erase. The speech recognizer 31 purges the data including saved functions/systems states and recognition templates or models associated with this index number. Termination of the erase mode is indicated by a reset erase flag. Each entry into the erase mode should be limited to one erase event.

As noted above and as will be described in detail below, embodiments of the speech actuated command program product 51 provide an efficient execution of embedded processes, a configurable speech observation window, integrity check algorithms including clipping, dynamic range utilization (annunciation to quiet), cropping, and post noise removal misalignment detection algorithms, a convolution-based speech alignment algorithm, and a noise removal algorithm incorporating thresholding of pre-equalized bins or pixels of a speech signal. The embodiments of the speech actuated command program product 51 also provide a core speech recognizer engine/classifier which can include both Hidden Markov and Neural Net modeling and models which can recognize sound patterns of the speech/utterances rather than merely words—making the speech recognizer language independent and negating a need to change vocabulary or language templates in order to utilize a different language.

Embodiments of the speech actuated command program product 51 provide for real-time association of speech with pilot-programmed, soft-key cockpit-switched macros (speech-activated switch macros), which can allow for automated initiation of a predefined aircraft system state or preselected or selected operational configuration. Embodiments of the speech actuated command program product 51 include instructions that when executed by the host processor 43 the display and control processor 45, and the avionic computer 49, individually or in unison, perform the operations of forming a digitized user-speech template from a speech signal (see FIG. 5) framed using a user-actuated switch, e.g., a push-to-talk switch 53, through an audio input device, e.g., microphone 55. According to a system parameter of a preferred configuration, the window is set at 1.5 seconds. Other time duration settings are, however, within the scope of the present invention. Also according to the preferred configuration, the data format is single channel, little-endian, having a 16-bit linear signed data resolution and a sample rate of approximately 8 kHz.

Achieving high recognition rates in speech recognition is benefited by having high quality training and recognition examples (models or templates). As such, the instructions can include those to perform a combination of integrity checks on the digitized user-speech template to identify when the speech/utterance is below a preselected standard, i.e., unacceptable for training or recognition attempts. An initial integrity check, for example, can include performing a dynamic range utilization analysis on the sampled (speech) data to determine if the speech is below a preselected minimum threshold level indicating the dynamic range of speech was used effectively, i.e., the utterance was too quiet. Dynamic range utilization can be performed by first over-sampling and then down-sampling the data signal to increase dynamic range and decrease noise. For example, if a sample rate of 48000 Hz is supported by the selected audio hardware, the recording software/program product, e.g., audio handler 35 or speech recognizer 31, can sample at this rate, and add 6 adjacent samples together. After this process, the signed data can be scaled to fit in 16 bits. If the signal level is below a predetermined threshold value, e.g., 16383, the speech or utterance can be determined to be too quiet. If the value reaches or exceeds a preselected clipping threshold, e.g., 32766, clipping can be determined to be occurring. Clipping is characteristic of an event where a speaker has spoken to loudly into the microphone 55.

According to an embodiment of the present invention, the instructions can also include those to perform additional post-noise removal integrity checks, described below. For example, instructions can include those to perform a cropping analysis on the digitized user-speech template which can be performed to determine if the speech is potentially missing portions of energy. This is characteristic where a user begins speaking prior to engaging the push-to-talk switch 53. A misalignment analysis can also be performed to determine if the speech was or was not successfully aligned during noise removal. The instructions can also include those to perform the operation of providing an integrity score to be used determine whether or not to prompt the user to repeat the speech/utterance to be trained or command annunciation, according to a preselected system parameter.

Figure 6:
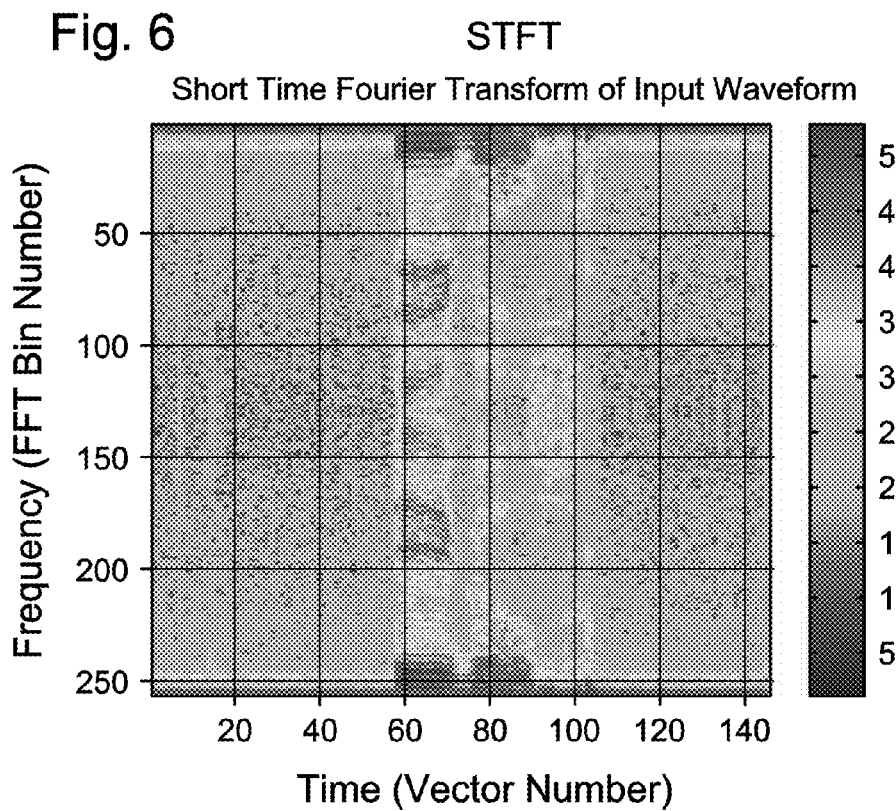
FIG. 6 is a spectrogram of the input waveform of FIG. 5 according to an embodiment of the present invention.
Figure 7:
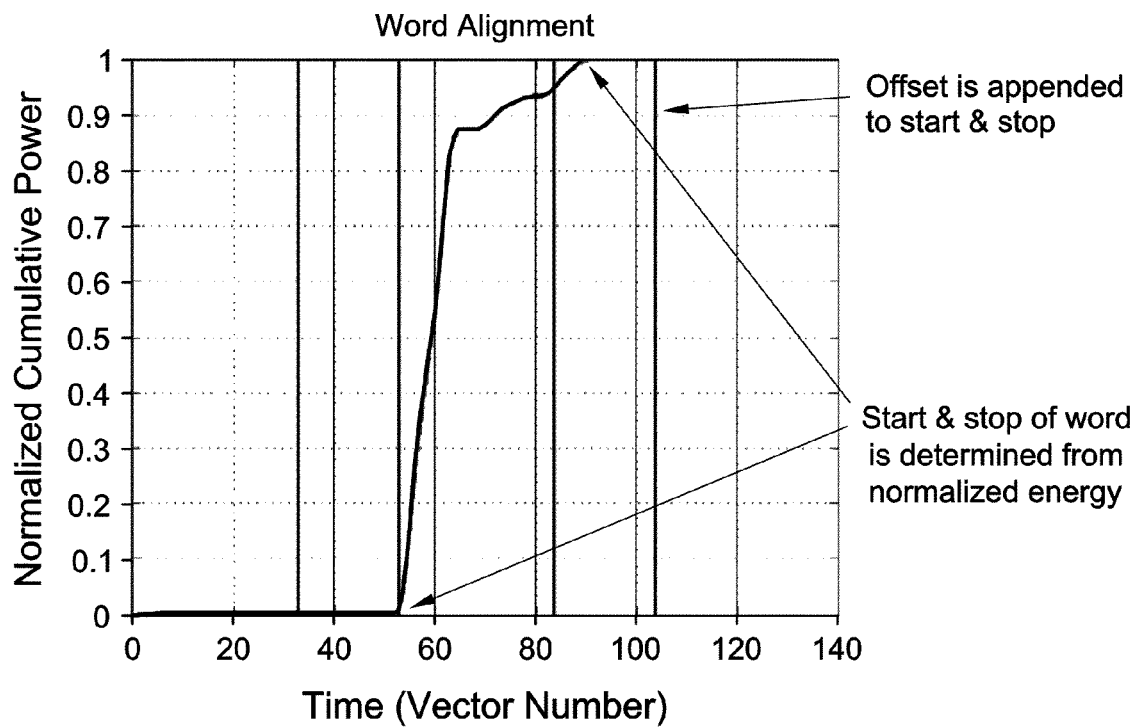
FIG. 7 is a graph illustrating alignment of the speech component portion of the spectrogram of FIG. 6 according to an embodiment of the present invention.
Figure 8:
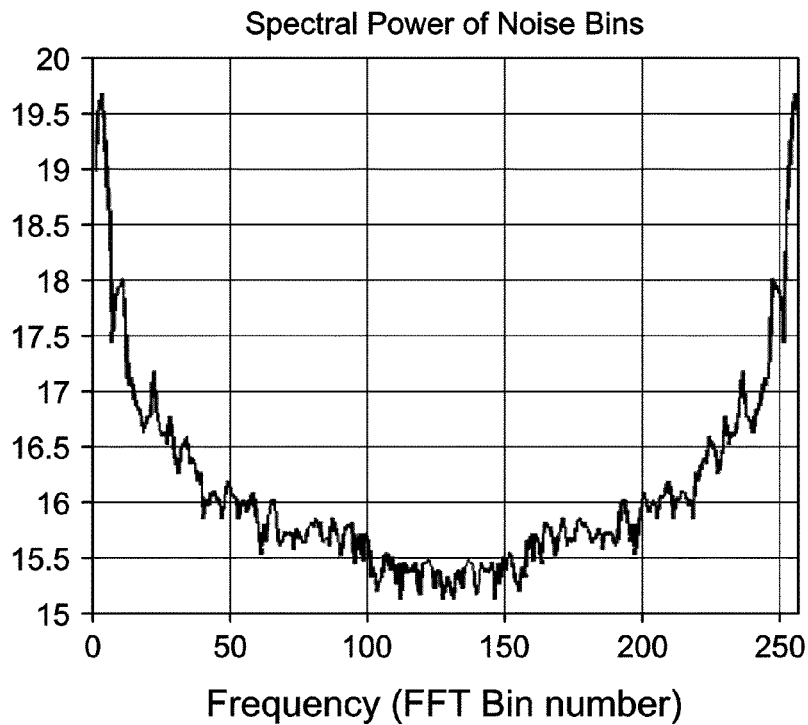
FIG. 8 is a graph illustrating the noise power component of the spectrogram of FIG. 6 according to an embodiment of the present invention.
Figure 16:
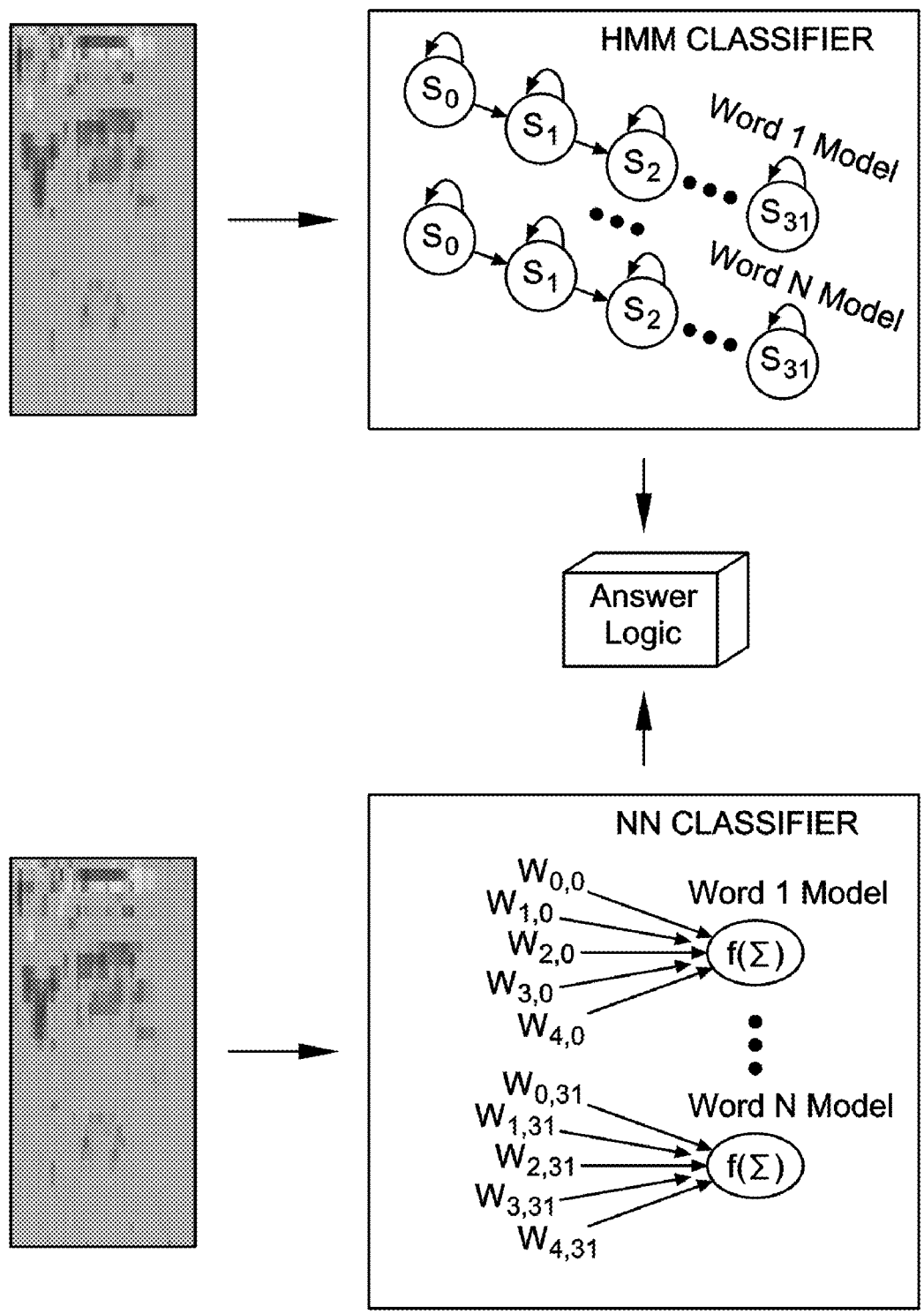
FIG. 16 is a schematic diagram of a pair of speech classifiers according to an embodiment of the present invention.

The user-speech template is then converted from the time domain into the frequency domain, for example, using a Short Time Fourier Transform (STFT) for further analysis (see FIG. 6). As also shown in FIG. 7, in order to enhance speech recognition and/or noise removal, the instructions can include those to perform the operation of aligning the speech/utterance within the template. That is, the actual speech/utterance can be aligned in an observation frame or window using, for example, a convolution-based algorithm to enhance analysis of the speech. To perform the alignment, the user-speech template can be divided into a plurality of time slices or vectors. A Short Time Fourier transformation is then performed on each time slice to form Fourier transformed data defining a spectrograph as known to those skilled in the art. The spectrograph amplitude values of each time slice are converted to decibels, e.g., by taking the log of the absolute value of the complex data. The converted amplitude values are then thresholded by a centering threshold to normalize the energy values within each time slice. The sum of each time slice, equivalent to the geometric mean of the frequency bins for the respective time slice, is computed to form an alignment vector. The alignment vector is then auto convolved to form a convolution of the alignment vector with itself. Mean positions of peaks of the convolution are then determined to identify the center of the speech, and the user-speech template is cyclically shifted to center the speech in the observation frame or window. Additionally, an offset can be appended to the beginning and ending of the word to cover areas of uncertainty. Note, the above described speech alignment process can instead be performed after feature extraction, described later.

As perhaps best shown in FIGS. 8-12, the instructions can include those to perform the operations of determining a background noise contour for noise within the observation frame or window and removing the noise from within and around speech formants of the aligned user-speech template using a nonlinear noise removal process such as, for example, by thresholding bins of equalized portions of the user-speech template. This can be accomplished, for example, by first estimating noise power (see FIG. 8) in each bin for each of a plurality of time slices, e.g., twenty, on either side of the speech near and preferably outside the boundaries of the speech for each of the frequency ranges defining the bins, and equalizing the energy values of the each bin across each of the frequency ranges in response to the estimated noise power to thereby "flatten" the spectrum (see FIG. 9). For each row of bins along the time axis, each bin can be divided by the estimated mean noise value for the row. The noise is effectively spread out and weakened, allowing the "stronger" speech to be better differentiated from the interleaved noise.

Each bin is then threshold by a predetermined value (see FIGS. 10-11) to remove the noise from the speech resulting in a speech signal illustrated in FIG. 12. Thresholding can include comparing each of the plurality of bins for each of the plurality of time slices to the parameterized value which can represent a noise condition according to operational profile developed through testing, and setting each bin having a value either at or below the parameterized value to zero or another nominal value to thereby remove the noise from the user-speech template, effectively reducing strong noise to the noise floor.

The instructions can also include those to perform the operation of developing a set of feature vectors representing energy of the frequency content of the user-speech template to determine a unique pattern. In an embodiment of the present invention, a set of feature vectors for HMM modeling and/or a set of feature vectors for NN modeling can be developed. In one embodiment, the features are extracted to calculate a spectrograph. In another embodiment, the spectrum is first transformed using the Mel Frequency bands to form the coefficients using, for example, a Fourier transform or discrete cosine transform. A Fourier transform is then applied to form a Mel Spaced Cepstrum illustrated in FIG. 13. The algorithm steps can include preemphasis, Short Time Fourier transform, Mel frequency bank, taking the log thereof, discrete cosine transform, liftering (non-linear filtering), and appending normalized energy within the Short Time Fourier transform to the Mel coefficients, as known and understood by those skilled in the art. In this embodiment of the present invention, 35 Mel filters are applied to form 12 Mel coefficients. As illustrated in FIGS. 14 and 15, first and second derivatives are then taken for inclusion in the feature vectors. A system parameter can be assigned to determine which one or both methodologies, or others known to those skilled in the art, should be applied to represent the spectrum for utilization by the speech recognition engine or engines. As noted above, these features describe the power residing in an utterance used to determine a pattern.

The instructions can include those to perform the operations of applying a speech recognition engine or engines to the set of feature vectors. That is, according to an embodiment of the present invention, a HMM speech recognition engine is applied to a first set of feature vectors known as cepstral processing and/or a NN speech recognition engine is applied to a second set of feature vectors, as graphically illustrated in FIG. 16 to develop a speech model or models. With respect to neural net modeling, a spectrograph is first developed using parameters different from those used in noise removal. That is, the power associated with the speech/utterance is provided in the frequency domain.

With respect to the Hidden Markov modeling, for each feature vector there is a number of states. As illustrated in FIGS. 17 and 18, for each state, a mean and variance of the features (peaks) of the feature vectors are calculated for each HMM state. The HMM model illustration of FIG. 17 illustrates the mean power level of the feature factor components at any particular state. Using multi-variance independent Gaussian statistics, the mean and variance is used to determine the probability a feature vector is in a particular state (see FIG. 19). Further, maximum and minimum limits are used to restrict variance values. According to an embodiment of the present invention, during HMM training, strengths on the minimum and maximum values within the algorithms are relaxed to improve accuracy to define diagonal loading. A counter provides for multiple (3-4) "radio on" commands provided to the headset 59 to build each model.

When performing training of a command annunciation, this analysis on each feature vector of a speech or utterance can be accomplished iteratively on multiple repetitions to produce the results shown in FIGS. 17-19. Also when performing training of a command annunciation, the instructions can include those to perform the operations of associating or otherwise assigning an index and/or either a function or system state to the speech recognition model or models associated with the speech and the operation of storing the speech recognition model or models, the assigned index, and optionally the function or system state in the database 63. Further, a separate group of speech recognition models can be formed and stored in the database 63 to coincide with the different operational environments having characteristically different environmental conditions.

When performing recognition, whether using HMM modeling or NN modeling, the result includes performing the operation of returning the index associated with a stored model determined to match the user-speech template, along with a confidence score indicating likelihood the match is correct. A log likelihood (FIG. 20) is calculated for each model in the database/dictionary 63 which can be used to determine which model or template most likely provides a match between a real-time command annunciation and those in the database/dictionary 63. According to an embodiment of the present invention, a recognition confidence score can be calculated which relates to how much better the best match is than the second best match. FIG. 21 illustrates an example calculation for the graph shown in FIG. 20. For example, a score of "zero" can indicate that the best two matches are substantially equally likely. A score of "one" can represent that the best match is many orders of magnitude better than the second best match. This score can be matched against a rejection threshold, e.g., 0.5 or some other preselected parameter value, for example, preset in the command function manager 33, as an impetus for requesting a user repeat the command annunciation. If the confidence score is at or above the threshold, an assigned function or assigned state can be executed.

According to an embodiment of the present invention, for each speech model, there is a corresponding number of isolated neural networks. The structure of a neuron of the neural network, according to embodiment of the present invention, can be three separately trained perceptrons, for example, for each index. During training, each neural network is given an index and is trained against each other speech model so that each neural net responds correctly to a comparison of the speech/utterance to be trained. If one or more of the neural networks respond incorrectly, weights (vector of weights) are adjusted adaptively to thereby develop the correct response—positively reinforcing correct responses and negatively reinforcing incorrect responses. For example, according to embodiment having a frequency spectrum with 128 bins (256 bins total) for each time slice and 110 time slices per utterance forming 110 feature vectors, up to 128×110 values are adjusted depending upon the responses. This can be accomplished for each of the three perceptrons for speech model/index.

Similar calculations are used during recognition except that no weights are adjusted. That is, the feature vectors are presented to each of the three perceptrons and the results among the three different perceptrons can be either summed (multiplied, summed and compared), or voted upon, according to a selected or preselected implementation which can be a system parameter. These schemes can be used when more than one index has a perceptron indicating that it is the correct result index. For summing, the results of each of the three perceptrons are multiplied by the vector of weights and the result is accumulated (matrix edition) for each conflicting index. The index having the highest value is selected as the proper response. For voting, the index having the most positive indications (votes) is selected as the proper response for conflicting indexes.

The instructions can also include those to perform the operations of executing a voting scheme between the HMM speech recognition engine and the NN speech recognition engine also according to a selected or preselected system parameter. Additionally, as described above, a confidence score can be matched against a rejection parameter as an impetus for requesting a user repeat the command annunciation. If the confidence score is at or above the threshold, an assigned function or assigned state can be executed.

Finally, the instructions can include those to perform the operations of configuring the system state and/or executing the speech-activated switch macro. This can be performed automatically. Alternatively, the instructions can include those to perform the operation of requesting a positive response/confirmation from the user prior to execution. Note, if recognition performance does not appear adequate, additional training can be provided by accessing the index via keys 71, 73, or 75. In a preferred embodiment, the instructions can include those to perform the operation of allowing the user to scroll between the trained index values to select a desired index.

As shown in FIG. 22, according to embodiment of the present invention, the speech actuated command program product 51 can be assembled into a plurality of categorically organized functional modules. For example, the speech recognizer 31 can include configuration functions, recognition functions, template functions, integrity check functions. According to an embodiment of the present invention, some of the major configuration functions include:

| vr_get_config: | |
| --- | --- |
| Declaration | vr_config vr_get_config(void) |
| Summary | Get configuration data structure |
| Input parameters | None |
| Output parameters | None |
| Returns | vr_config data structure containing the current configuration. |
| Description | Retrieves a copy of the vr_config data structure holding the user configurable parameters of the voice recognition API. |
| vr_init: | |
| Declaration | void vr_init(vr_config *cfg) |
| Summary | Initialize voice recognition API |
| Input parameters | cfg - Configuration data structure |
| Output parameters | None |
| Returns | None |

-continued

| | |
|---|---|
| Description | Copies the values in the structure pointed to by "cfg" to the internal configuration structure, and recomputes derived quantities. | vr_load_config:

| | |
|---|---|
| Declaration | int vr_load_config(char *filename) |
| Summary | Load configuration from file. |
| Input parameters | filename - The name of the file containing configuration data |
| Output parameters | None |
| Returns | 1 on success, 0 on failure |
| Description | Copies the values in the structure pointed to by "cfg" to the internal configuration structure, and recomputes derived quantities. Configuration is specified with lines like: double collection_time = 1.5. |

Some of the major training functions include:

vr_train_word:

| | |
|---|---|
| Declaration | int vr_train_word(short *buf, int len, int word_index) |
| Summary | Add training example for word (utterance) |
| Input parameters | buf - pointer to array of audio data<br>len - length of array (in 16-bit samples)<br>word_index - the index of word (utterance) for this example |
| Output parameters | None |
| Returns | Current training count on success, 0 on failure |
| Description | Updates the training example set for this word (utterance) with the data pointed to by "buf". This command only updates the examples in the database. It does not re-run the training pass. A subsequent call to vr_train is necessary to actually update the models. This functionality is separated so that several examples of several different words (utterances) may be presented before the compute-intensive training pass is incurred. | vr_train:

| | |
|---|---|
| Declaration | int vr_train( ) |
| Summary | Run training on all words (utterances) needing update. |
| Input parameters | None |
| Output parameters | None |
| Returns | 1 on success, 0 on failure |
| Description | Complete the training process on all words (utterances) needing update, for the currently selected parameter set. | vr_untrain_word:

| | |
|---|---|
| Declaration | int vr_untrain_word(int word_index) |
| Summary | Removes the last instance from the training record |
| Input parameters | Word_index - 1-based index of word (utterance) to back out |
| Output parameters | None |
| Returns | 1 on success, 0 on failure |
| Description | This is an "undo" for recording a word (utterance) example in the training process. It is to be issued after presenting a training example via vr_train_word, but before a final training call to vr_train. | vr_clear_word:

| | |
|---|---|
| Declaration | int vr_clear_word(int word_index) |
| Summary | Clear word (utterance) entirely |
| Input parameters | Word_index - 1-based index of word (utterance) to remove |
| Output parameters | None |
| Returns | 1 on success, 0 on failure |
| Description | Completely remove word (utterance) from training records. The given index is freed up for use by another command. | vr_clear_all:

| | |
|---|---|
| Declaration | int vr_clear_all( ) |
| Summary | Remove all words (utterances) from dictionary |
| Input parameters | None |
| Output parameters | None |
| Returns | 1 on success, 0 on failure |
| Description | Erases user dictionary creating a blank template for training. | vr_list_words:

| | |
|---|---|
| Declaration | int vr_list_words( )) |
| Summary | List occupied word (utterance) indices and training counts |
| Input parameters | None |
| Output parameters | None |
| Returns | 1 on success, 0 on failure |
| Description | List all words (utterances) indices in dictionary and the corresponding training examples present for each word (utterance). |

Some of the major recognition functions include:

vr_recognize:

| | |
|---|---|
| Declaration | int vr_recognize(short *buf, int len) |
| Summary | Recognize word (utterance) |
| Input parameters | buf - buffer of signed shorts containing raw speech samples<br>len - length of the buffer in samples (shorts) |
| Output parameters | None |
| Returns | Word (utterance) index on success, 0 on failure |
| Description | Completely remove word (utterance) from training records. The given index is freed up for use by another command. |

Some of the major template control functions include:

vr_save_template:

| | |
|---|---|
| Declaration | int vr_save_template(char *dest_filename) |
| Summary | Save current speaker commands and training templates to file |
| Input parameters | dest_filename - Full path and name to file |
| Output parameters | None |
| Returns | 1 on success, 0 on failure |
| Description | Save all commands and training data to the specified file for restoring at a later time. | vr_restore_template:

| | |
|---|---|
| Declaration | vr_restore_template(char *source_filename) |
| Summary | Restore speaker commands and training templates from file |
| Input parameters | source_filename - Full path and name to file |
| Output parameters | None |
| Returns | 1 on success, 0 on failure |
| Description | Restore all commands and training data from the specified file which has previously been saved using "vr_save_template." |

Some of the major integrity check functions include:

vr_get_clipped:

| | |
|---|---|
| Declaration | int vr_get_clipped(void) |
| Summary | Determine if word (utterance) has exceeded bit range |
| Input parameters | None |

-continued

| | |
|---|---|
| Output parameters | None |
| Returns | Non-zero if clipped, 0 otherwise |
| Description | Determine if word (utterance) is clipped, that is, determine if any of the word (utterance) samples exceed a threshold set close to the limit of the 16-bit signed data. | vr_get_cropped:

| | |
|---|---|
| Declaration | int vr_get_cropped(void) |
| Summary | Determine if word (utterance) cropping likely occurred. |
| Input parameters | None |
| Output parameters | None |
| Returns | Non-zero if cropped, 0 otherwise |
| Description | Determine if word (utterance) is cropped, that is, determine if the word (utterance) likely is missing information (outside of the sampling interval). | vr_get_misaligned:

| | |
|---|---|
| Declaration | int vr_get_misaligned(void) |
| Summary | Determine if word (utterance) can be aligned in noise removal. |
| Input parameters | None |
| Output parameters | None |
| Returns | Non-zero if alignment problem, 0 otherwise |
| Description | Determine if the word (utterance) was successfully aligned in the noise removal stage. Inability to align could indicate excessive noise or cropping problems. | vr_get_quiet:

| | |
|---|---|
| Declaration | int vr_get_quiet(void) |
| Summary | Determine if word (utterance) is low in volume |
| Input parameters | None |
| Output parameters | None |
| Returns | Non-zero if alignment problem, 0 otherwise |
| Description | Determine if the word (utterance) example makes poor use of available dynamic range. If word (utterance) is too quiet, quantization noise and scaling problems will adversely affect performance of the recognition system. | vr_get_integrity:

| | |
|---|---|
| Declaration | int vr_get_integrity(void) |
| Summary | Determine if word (utterance) passes integrity checks |
| Input parameters | None |
| Output parameters | None |
| Returns | Non-zero if integrity problem, 0 otherwise<br>The bitmasks are defined as follows:<br>Vr_Mask_Clipped  1<br>Vr_Mask_Misaligned 2<br>Vr_Mask_Cropped  4<br>Vr_Mask_Quiet  8 |
| Description | Determine if the word (utterance) has any problems with the integrity checks. If there is a problem, a non-zero value is returned with bit positions set for the detected problems. |

It is important to note that while embodiments of the present invention have been described in the context of a fully functional system, those skilled in the art will appreciate that the mechanism of the present invention and/or aspects thereof are capable of being distributed in the form of a computer readable medium of instructions in a variety of forms for execution on a processor, processors, or the like, and that the present invention applies equally regardless of the particular type of signal bearing media used to actually carry out the distribution. Examples of computer (processor) readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and transmission type media such as digital and analog communication links. For example, such media can include both operating instructions and instructions related to the speech actuated command program product 51 described above and much of the method steps described below.

As perhaps best shown in FIG. 23, embodiments of the present invention include methods of providing speech-activated control of aerial vehicle components. For example, a method to provide speech-activated control of aerial vehicle components, according to an embodiment of the present invention, can include the steps of receiving an analog speech signal (see FIG. 5) framed using a user-actuated switch, e.g., a push-to-talk switch 53, through an audio input device, e.g., microphone 55 (block 101), and converting the speech signal into digital speech data and sampling the speech data defining sampled data (block 103). Various integrity checks can be initially performed on the sampled data (block 105) to identify when the speech is below a preselected standard, i.e., unacceptable for training or recognition attempts.

An initial integrity check, for example, can include performing a dynamic range utilization analysis on the sampled data to determine if the speech is below a preselected minimum threshold level indicating the speech was used effectively, i.e., too quiet. Dynamic range utilization can be performed by first over-sampling and then down-sampling the data signal to increase dynamic range and decrease noise, described previously. The signed data can be scaled to fit in 16 bits. If the signal level is below a predetermined threshold value, e.g., 16383, the speech or utterance can be determined to be too quiet. If the value reaches or exceeds a preselected clipping threshold, e.g., 32766, clipping can be determined to be occurring. Clipping is characteristic of an event where a speaker has spoken too loudly into the microphone 55.

The sampled data is then converted from the time domain into the frequency domain (block 107) using, for example, a Short Time Fourier transform (STFT) for further analysis (see FIG. 6). As also shown in FIG. 7, in order to enhance speech recognition and/or noise removal, speech/word alignment can be performed (block 109). That is, the sampled data can be aligned in an observation frame or window using a convolution-based algorithm, for example, to enhance analysis of the speech. To perform the alignment, the sampled data can be divided into a plurality of time slices or vectors. A Short Time Fourier transformation is then performed on each time slice to form Fourier transformed data defining a spectrograph as known to those skilled in the art. The spectrograph amplitude values of each time slice are converted to decibels, e.g., by taking the log of the absolute value of the complex data of each STFT amplitude value. The converted amplitude values are then threshold by a centering threshold to normalize the energy values within each time slice. The sum of each time slice, equivalent to the geometric mean of the frequency bins for the respective time slice, is then computed to form an alignment vector. The alignment vector is then auto convolved to form a convolution of the alignment vector with itself. The mean positions of peaks of the convolution are then determined to identify the center of the speech, and the sampled data is cyclically shifted to center the speech in the observation frame or window. Additionally, an offset can be appended to the beginning and ending of the word or utterance to cover areas of uncertainty. Note, the above described speech alignment process can instead be performed after feature extraction.

A background noise contour for noise within the observation frame or window can be determined (block 111) and the noise can be removed from within and around speech formants of the sampled data using a nonlinear noise removal process (block 113) such as, for example, by thresholding bins of equalized portions of the sampled data (see FIGS. 8-12). This can be accomplished, for example, by first estimating noise power (see FIG. 8) in each bin for each of a plurality of time slices, e.g., 20, on either side of the speech near and preferably outside boundaries of the speech for each of the frequency ranges defining the bins, and equalizing the energy values of the each bin across each of the frequency ranges responsive to the estimated noise power to thereby "flatten" the spectrum (see FIG. 9). For each "row" of bins along the time axis, each bin can be divided by the estimated mean noise value for that row. The noise is effectively spread out and weakened, allowing the "stronger" speech to be better differentiated from the interleaved noise.

Each bin is then threshold by a predetermined value (see FIGS. 10-11) to remove the noise from the speech illustrated in FIG. 12. The step of the thresholding includes comparing each of the plurality of bins for each of the plurality of time slices to a parameterized value which can represent a noise condition developed through testing according to operational profile, and setting each bin having a value either at or below the parameterized value to zero or another nominal value to thereby remove the noise from the sampled data, effectively reducing strong noise to the noise floor.

According to an embodiment of the present invention, additional integrity checks are performed (block 115). For example, a cropping analysis on the sampled data can be performed to determine if the speech is potentially missing portions of energy. This is characteristic where a user begins speaking prior to engaging the push-to-talk switch 53. The sampled data is then inverse transformed and reassembled in the time domain for further speech recognition processing, and an additional integrity check, e.g., a misalignment analysis, can be performed on the sampled data to determine if the speech was successfully aligned during the noise removal process. Note, the integrity checks need not be performed specifically at the temporal location or in the order described. An integrity score can be provided to prompt the user to repeat the speech/utterance to be trained or command annunciation either after the step indicated by blocks 105 or 115, according to a preselected system parameter.

A set of feature vectors representing energy of the frequency content of the sampled data is developed to thereby determine a unique pattern (block 117). In an embodiment of the present invention, a set of feature vectors for HMM modeling and/or a set of feature vectors for NN modeling can be developed. In one embodiment, as known and understood by those skilled in the art, features are extracted to calculate a spectrograph such as that described above. In another embodiment, the spectrum is first transformed using the Mel Frequency bands to form the coefficients using, for example, a Fourier transform or discrete cosine transform. A Fourier transform is then applied to form a Mel Spaced Cepstrum illustrated in FIG. 13. First and second derivatives are then taken for inclusion in the feature vectors (see FIGS. 14 and 15). A system parameter can be assigned to determine which one or both methodologies, or others known to those skilled in the art, should be applied to represent the spectrum for utilization by the speech recognition engine or engines.

A speech recognition engine or engines are applied to the set of feature vectors (block 119). That is, according to an embodiment of the present invention and as graphically illustrated in FIG. 16, a HMM speech recognition engine is applied to a first set of feature vectors known as cepstral processing and/or a NN speech recognition engine is applied to a second set of feature vectors, to develop a speech model or models. With respect to Neural Net modeling, a spectrograph is first developed using parameters typically different from those used in noise removal.

With respect to the Hidden Markov modeling, for each feature vector there are a number of states. For each state, a mean and variance of the features (peaks) of the feature vectors are calculated for each HMM state (see FIGS. 17 and 18). The HMM model illustration of FIG. 17 illustrates the mean power level of the feature factor components at any particular state.

When performing training of a command annunciation, this analysis on each feature vector of a speech or utterance can be accomplished iteratively on multiple repetitions to produce the results shown in FIGS. 17-19. Also, when performing training of a command annunciation, the method can further include associating or otherwise assigning an index and/or either a function or system state to the speech recognition model or models associated with the speech and storing the speech recognition model or models, the assigned index, and optionally the function or system state (block 123). This model-index combination for a plurality of speech recognition models can be saved for each of a separate plurality of operational profiles. Note, according to embodiment of the present invention, also during HMM training, constraints on the minimum and maximum values within the algorithms can be relaxed to improve accuracy.

When performing recognition (block 125), whether using HMM modeling or NN modeling, the result can include returning the index associated with a stored model determined to match the sampled data along with a confidence score indicating likelihood the match is correct. A log likelihood (FIG. 20) is calculated for each model in the database/dictionary 63 which can be used to determine which model most likely provides a match between a real-time command annunciation and those in the database/dictionary. According to an embodiment of the present invention, a recognition confidence score can be calculated which relates to how much better the best match is then the second best match. FIG. 21 illustrates an example calculation of calculation for the graph shown in FIG. 20. If the confidence score is at or above the threshold, an assigned function or assigned state can be executed.

According to an embodiment of the present invention, for each speech model there are a corresponding number of isolated neural networks. The structure of a neuron of the neural network, according to embodiment of the present invention, is three separately trained perceptrons for each index. During training, each Neural Network is given an index and is trained against each other's speech model so that each Neural Network responds correctly to a comparison of the speech/utterance to be trained. If one or more of the Neural Networks respond incorrectly, weights (vector of weights) are adjusted adaptively to thereby develop the correct response—positively reinforcing correct responses, negatively reinforcing incorrect responses. This can be accomplished for each of the three perceptrons for speech mode/index.

Similar calculations are used during recognition except that no weights are adjusted. That is, the feature vectors are presented to each of the three perceptrons and the results among the three different perceptrons can be either summed (multiplied, summed and compared) or voted upon, according to a selected or preselected implementation which can be a system parameter. These schemes can be used when more than one index has a perceptron or perceptrons indicating that it is the correct result index. For summing, the results of each of the, e.g., three, perceptrons are multiplied by the vector of weights and the result is accumulated (matrix edition) for each conflicting index. The index having the highest value is selected as the proper response. For voting, the index having the most positive indications (votes) is selected as the proper response for conflicting indexes.

The method can also include executing a voting scheme between the HMM speech recognition engine and the NN speech recognition engine also according to a selected or preselected system parameter (block 127). Additionally, as described above, a confidence score can be matched against a rejection parameter as an impetus for requesting a user repeat the command annunciation. If the confidence score is at or above the threshold an assigned function or assigned state can be executed (block 129). Otherwise, a user can be requested to repeat the command annunciation.

Figure 24:
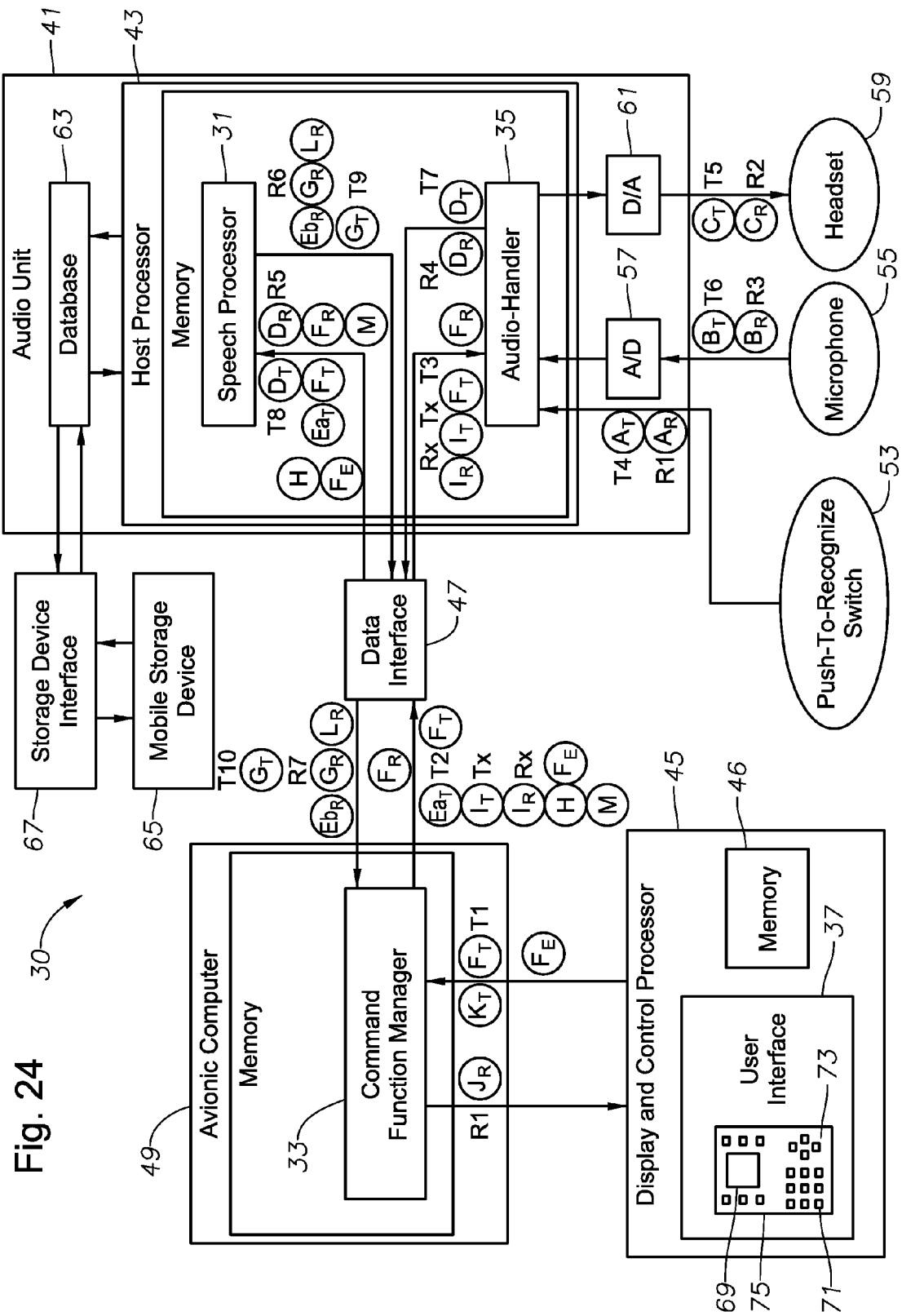
FIG. 24 is a schematic block diagram of a general system architecture of a system for controlling aerial vehicle components illustrating training and recognition dataflow according to an embodiment of the present invention.

FIG. 24 illustrates a partial data flow model in operation between the components of system 30 according to one embodiment of the present convention. Legs $T_1$-$T_{10}$ and $T_X$ indicate the dataflow during training, and legs $R_1$-$R_8$ and $R_X$ indicate the dataflow during recognition (listening). Note, the items in the table illustrated in FIG. 25 represent the type of data in transit along the various training and recognition legs $T_1$-$T_{10}$, $T_X$, $R_1$-$R_8$ and $R_X$. Note also, the "x" with respect to legs $T_X$ and $R_X$ indicate that these legs may be performed either in differing sequence positions or multiple sequence positions according to the preferred embodiment of the present invention.

Using an aircraft as an example vehicle, the pilot first trains multiple command annunciations in the form of speech and associates them with an index value. The pilot accesses the functionality of the user interface 37 via the display and control processor 45. The pilot first selects keys 71, 73, 75, to select functions displayed on display 69 to provide the command function manager 33/avionic computer 49 the selected mode, e.g., train mode $F_T$, and any pilot-selected function or to state definition $K_T$, as indicated at $T_1$. The command function manager 33 associates the function or state definition $K_T$ with a training index $Ea_T$ used to identify a speech/utterance $B_T$ to be trained and passes the training index $Ea_T$, along with the mode $F_T$ to the data interface 47, indicated at $T_2$. Optionally, the command function manager 33 can also pass a speech engine selection H to the speech recognizer 31, such as, for example, HMM, NN, both, and/or other speech engine known to those skilled in the art. Note, an erase mode FE can be passed to erase a trained speech/utterance.

The data interface 47 passes the train mode $F_T$ to the audio handler 35 as indicated at $T_3$ to allow the audio handler 35 to prepare to receive a speech signal. The pilot then depresses the push-to-recognize switch 53 which sends a signal $A_T$, as indicated at $T_4$, which indicates to the audio handler 35 the need to form a window to build a user-speech template $D_T$. The audio handler 35 provides audio feedback $C_T$ through the digital to analog converter 61 to the pilot indicating it is ready to receive the speech/utterance $B_T$, indicated at $T_5$.

The pilot then provides a spoken command $B_T$ through the analog to digital converter 57 to the audio handler 35, as indicated at $T_6$. The audio handler 35 creates the digitized user-speech template $D_T$ and passes the template $D_T$ to the data interface 47, as indicated at $T_7$. The data interface 47 passes the training index $Ea_T$, mode $F_T$, and user-speech template $D_T$ to the speech recognizer 31, as indicated at $T_8$. The speech recognizer 31 processes the windowed and digitized speech/utterance, performing integrity checks, aligning the speech/utterance within the window, removing noise, extracting features, and building training models for storage in database 63, as described previously. The speech recognizer 31 then passes an integrity score $G_T$ to the data interface 47, indicated at $T_9$, and the data interface 47 passes the integrity score $G_T$ to the command function manager 33, as indicated at $T_{10}$. The command function manager 33 can request a repeat $I_T$ indicated at $T_X$ if the score does not meet a preselected or selected parameter, which is passed through the data interface 47 to the audio handler 35. The steps indicated as $T_4$-$T_{10}$ are then repeated as necessary. Even if the integrity score $G_T$ indicates sufficient integrity, for model training purposes, the steps indicated as $T_2$-$T_{10}$ can be repeated, for example, three times to enhance model training. The steps indicated at $T_1$-$T_{10}$ are repeated for each of a plurality of command annunciations, e.g., up to fifty or so, for example, unless preloaded in the database 63 through use of the mobile storage device 65 and mobile storage device interface 67.

Having trained one or more command utterances, to perform recognition of a command annunciation, the pilot depresses the push-to-recognize switch 53 which sends a signal $A_R$, as indicated at $R_1$, which indicates to the audio handler 35 the need to form a window to build a user-speech template $D_R$. A recognize mode $F_R$ indication can also be passed to the audio handler 35, depending upon the configuration. The audio handler 35 can provide audio feedback $C_R$ through the digital to analog converter 59 to the pilot indicating it is ready to receive a speech/utterance, indicated at $R_2$.

The pilot then provides a spoken command $B_R$ through the microphone 55 and the analog to digital converter 57 to the audio handler 35, as indicated at $R_3$. The audio handler 35 creates the digitized user-speech template $D_R$ and passes the template $D_R$ to the data interface 47, as indicated at $R_4$. The data interface 47 passes the user-speech template $D_R$ to the speech recognizer 31, as indicated at $R_5$. The data interface 47 can also pass a rejection threshold M received from the command function manager 33. The speech recognizer 31 processes the windowed and digitized speech/utterance, performing integrity checks, aligning the speech/utterance within the window, removing noise, extracting features, and speech recognition for retrieval from database 63, as described previously. The speech recognizer 31 initially passes an integrity score $G_R$ to the data interface 47 and later a listening index $Eb_R$ along with a confidence score $L_R$, indicated at $R_6$. The data interface 47 passes the integrity score $G_R$ and later a listening index $Eb_R$ along with the confidence score $L_R$ to the command function manager 33, as indicated at $R_7$. The command function manager 33 can request a repeat I indicated at $R_X$ if either the integrity score $G_R$ or the confidence score $L_R$ does not meet a preselected or selected parameter, which is passed through the data interface 47 to the audio handler 35 which causes a prompt requesting repeat to be sent to the headset 59. The steps indicated as $R_1$-$R_7$ are then repeated as necessary. If the confidence score $L_R$ was adequate, the command function manager 33 passes the function/state definitions $J_R$ to the display and control processor 45, indicated at $R_8$.

The invention has numerous advantages. Embodiments of the present invention advantageously provide a speech-activated control system for controlling aerial vehicle components designed to exhibit robust and fast recognition in both cockpit and control station environments and designed to support multiple command sets, speakers, and languages, and that does not require a pre-conceived intended use or knowledge of elements in a pre-designed vocabulary database or template. Embodiments of the speech-activated control system provide an executable having: a small compiled footprint for use in embedded applications; efficient execution of embedded processes; a configurable utterance observation window; a noise abatement algorithm incorporating a unique and convolution-based utterance alignment algorithm and thresholding of pre-equalized bins or pixels of an utterance signal; integrity check algorithms including clipping, cropping, dynamic range utilization, and misalignment checks; and a core speech recognizer which includes Hidden Markov model and Neural Net models which can recognize sound patterns of the utterances rather than merely words—making the speech recognizer language independent and negating a need to change vocabulary or language templates in order to utilize a different language. Embodiments of the present invention advantageously provide easy speaker access and an embeddable interface which can include a combination of a display, a digital input device, e.g., scroll or push buttons, and an audio input device, e.g., microphone, which in combination can allow the user to specify an index number associated with an utterance and to map a function or state to the index number and utterance.

According to various embodiments of the present invention, the noise removal process enables use of speech recognition under normally prohibitive background noise. The speech removal process can employ a novel convolution-based algorithm to align isolated speech at a central position of an observation frame. The process also applies efficient transform analysis to separate the user's audio signal in time and frequency. The background noise contour is then determined and normalized to uniformity. Bins determined to contain noise are then removed from within and around the speech formants. The speech signal is then inverse-transformed and reassembled to a time domain representation. Existing implementations do not adequately address such removal of noise which is characteristic of the operational environments, as advantageously provided by herein.

According to various embodiments in the present invention, a speech recognizer to vehicle (or control station) interface, unique to cockpit speech integration and associated aircraft integration, can divorce the speech engine from the aircraft-related, speech-command functionality. The interface can enable the aircraft functionality chosen for speech command to be transparent to the speech recognizer. The interface can support the unique capability of the speech recognizer to enable user selection of speech command functionality in real time. The interface also can provide for user options to call the Hidden Markov model and/or the Neural Net engines, thus providing potential for improved recognition performance by enabling comparison of identifiers and scores returned by the Hidden Markov model and Neural Net engines. Advantageously, training can provide for building multiple models to be used to enhance robustness of the speech recognition process. A separate template having different utterances and/or parameterized values used in noise removal can be formed for each operational configuration of a vehicle to also enhance robustness of the speech recognition. Further, according to an embodiment, the size of the utterance observation window encapsulating the speech can be configured to meet the operational requirements. According to various embodiments of the present invention, the pilot or control station operator can select a function in real time for speech command. A particular instantiation of this approach is called the speech activated switch macro. The speech activated switch macro can enable the user to record a series of "switch hits" and assign a name of choice to that sequence of switch actuations (i.e. switch macro). Upon recognition of the respective spoken command, the system then executes the macro.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

The invention claimed is:

1. A speech activated control system for controlling aerial vehicle components, comprising:
   a host processor having memory and positioned in communication with a database for storing speech recognition models; and
   speech actuated command program product at least partially stored in the memory of the host processor and including instructions that when executed by the host processor cause the processor to perform the operations of:
      forming a digitized user-speech template representing a command annunciation,
      dividing the user-speech template into a plurality of time slices,
         subdividing each separate one of the plurality of time slices into a plurality of bins each associated with a corresponding different one of a plurality of frequency ranges,
      performing a noise reduction and speech enhancement on the digitized user-speech template to include:
         estimating noise power for each separate set of bins having a same frequency range across the plurality of time slices to thereby provide a plurality of frequency range-specific noise power estimates,
         equalizing energy values of each set of bins having a same frequency range across the plurality of time slices responsive to the respective frequency range-specific noise power estimate, and
         thresholding each equalized bin by a predetermined value to remove noise from within and around speech formants of the user-speech template,
      developing a set of feature vectors representing energy of a frequency content of the digitized user-speech template to thereby determine a unique pattern identifying the command annunciation,
      applying a speech recognition engine to the set of feature vectors to form at least one speech recognition model associated with the command annunciation,
      associating an index with the at least one speech recognition model associated with the command annunciation, and
      storing the at least one speech recognition model and the associated index.

2. The system as defined in claim 1, wherein the speech actuated command program product further includes instructions to perform the operations of:
   receiving the command associated annunciation real-time in-flight indicating a request for recognition;
   returning the index associated with a stored model determined to match the command annunciation;
   returning a confidence score indicating likelihood the match is correct; and
   executing an assigned function or forming an assigned state when the confidence score is above a preselected or selected threshold value.

3. The system as defined in claim 1, wherein the speech actuated command program product further includes instructions to perform the operations of:
   recording during aircraft operation a series of switch engagements to form a speech-activated switch macro describing a command function or system state; and
   receiving the associated command annunciation real-time in-flight; and associating the speech-activated switch macro with a representation of the command annunciation.

4. The system as defined in claim 1, wherein the speech actuated command program product further includes instructions to perform the operations of:

performing a dynamic range utilization analysis on the digitized user-speech template to determine if the command annunciation is below a preselected minimum threshold level; and performing a plurality of post-noise removal integrity checks, to include:

performing a clipping analysis on the digitized user-speech template to determine if the command annunciation has exceeded a preselected threshold value, performing a cropping analysis on the digitized user-speech template to determine if the command annunciation is missing portions of energy, performing a misalignment analysis on the digitized user-speech template to determine if the command annunciation was successfully aligned during noise removal, and returning an integrity score grading the quality of the command annunciation to determine if the command annunciation is acceptable for training or recognition.

5. The system as defined in claim 1, wherein the speech actuated command program product further includes instructions to perform the operation of aligning the command annunciation in the digitized user-speech template to enhance analysis of the command annunciation, the alignment including the operations of:

determining a geometric mean of each of the plurality of bins for each of the plurality of time slices to thereby form an alignment vector;

auto convolving the alignment vector to form a convolution of the alignment vector with itself;

determining a mean position of peaks of the convolution to identify the center of the speech; and cyclically shifting the sampled data to center the speech in the observation window.

6. The system as defined in claim 1, wherein the operation of developing a set of feature vectors representing energy of a frequency content of the digitized user-speech template includes the operations of:

transforming a spectrum comprising normalized post-noise-reduction speech data using Mel frequency bands to form a plurality of Mel coefficients;

applying a Fourier transform to the Mel coefficients to form a Mel Spaced Cepstrum; and determining first and second derivatives of the Mel Spaced Cepstrum.

7. The system as defined in claim 1, wherein the operation of estimating noise power includes estimating noise power for each of the plurality of bins for each of the plurality of time slices, located on either side of the command annunciation near and outside boundaries of the command annunciation for each of the plurality of frequency ranges, to thereby determine a background noise contour for noise within the speech template; and wherein the operation of thresholding bins includes the operations of thresholding each bin by a predetermined parameterized value to remove the noise from the speech template.

8. The system as defined in claim 7, wherein the operation of the thresholding further includes performing the operations of:

comparing each of the plurality of bins for each of the plurality of time slices to the parameterized value; and setting each bin having a value below the parameterized value to approximately zero to thereby remove the noise from the sampled data from within and around speech formants.

9. The system as defined in claim 1, further comprising:

an avionic computer in communication with the host processor and having memory and a portion of the speech actuated command program product defining a command function manager stored in the memory; and a display and control processor in communication with the avionic computer and having memory and a portion of the speech actuated command program product defining a user interface stored in the memory.

10. The system as defined in claim 9, wherein the speech actuated command program product further includes instructions to perform the operations of:

receiving a command function or system state;

receiving the command associated annunciation real-time in-flight; and associating the command function or system state with a representation of the command annunciation.

11. The system as defined in claim 9, further comprising:

a data interface in communication with the avionic computer and the host processor positioned to divorce speech command recognition functionality from aircraft-related speech-command functionality; and a mobile storage device interface to allow an operator to retrieve trained speech models, associated index numbers, and associated functions or vehicle system states from the database and to load previously trained speech models, associated index numbers, and associated functions or vehicle system states to the database.

12. A method to provide speech-activated control of aerial vehicle components, the method comprising the steps of:

(a) sampling a speech signal representing speech to define sampled data;

(b) performing an integrity check on the sampled data to identify when the speech is below a preselected standard;

(c) aligning the sampled data in an observation window to enhance analysis of the speech;

(d) performing noise reduction processing to remove noise from within and around speech formants, to include:

estimating noise power for each separate set of a plurality of bins having a same frequency range across a plurality of time slices of the sampled data to thereby provide a plurality of frequency range-specific noise power estimates, equalizing energy values of each set of bins having a same frequency range across the plurality of time slices responsive to the respective frequency range-specific noise power estimate, and thresholding each equalized bin by a parameterized threshold value to remove noise from within and around speech formants of the sampled data;

(e) developing a set of feature vectors representing energy of a frequency content of the sampled data to thereby determine a unique pattern; and (f) applying a speech recognition engine to the set of feature vectors to perform one of the following functions: forming at least one speech recognition model associated with the speech signal, and matching the speech signal to the at least one speech recognition model.

13. The method as defined in claim 12,
wherein step (b) includes the step of performing a dynamic range utilization analysis on the sampled data to determine if the speech is at or below a preselected minimum threshold level indicating the speech was too quiet; and
wherein the method further comprises the steps of:
performing a clipping analysis on the sampled data to determine if the speech met or has exceeded a preselected maximum value indicating that clipping has occurred,
providing an integrity score indicating quality of the speech, and
requesting repeat of the speech responsive to the integrity score when the integrity score is below a preselected or selected value to thereby enhance speech-model development when in a training mode or to thereby enhance recognition accuracy when in a recognition mode.

14. The method as defined in claim 12, wherein step (c) includes the steps of:
dividing the sampled data into a plurality of time slices;
performing a short time fourier transformation on each time slice to form fourier transformed data defining a spectrograph;
converting spectrograph amplitude values of each time slice to decibels;
thresholding the amplitude values by a centering threshold to normalize the energy values within each time slice;
determining a geometric mean of each of a plurality of bins for each time slice to thereby form an alignment vector;
auto convolving the alignment vector to form a convolution of the alignment vector with itself;
determining a mean position of peaks of the convolution to identify the center of the speech; and
cyclically shifting the sampled data to center the speech in the observation window.

15. The method as defined in claim 12, wherein step (f) includes relaxing constraints on a minimum value, a maximum value, or both the minimum and the maximum value within a Hidden Markov model when performing speech training.

16. The method as defined in claim 12,
wherein step (e) includes developing a first set of feature vectors for Hidden Markov Model (HMM) modeling and a second set of feature vectors for Neural Network (NN) modeling; and
wherein step (f) includes applying a HMM speech recognition engine to the first set of feature vectors and a NN speech recognition engine to the second set of feature vectors; and
wherein the method further comprises executing a voting scheme between a plurality of speech recognition engines including at least one of the following: the HMM speech recognition engine and the NN speech recognition engine.

17. The method as defined in claim 12, further comprising the step of iteratively forming a plurality of speech recognition models for each of a separate plurality of operational profiles having differing environmental characteristics including a substantially different background noise contour.

18. The method as defined in claim 12, wherein the step of developing a set of feature vectors includes developing one or more sets of feature vectors, and wherein the method further comprises:
applying each of a plurality of speech recognition engines separately to at least one of the one or more sets of feature vectors; and
executing a voting scheme between the plurality of speech recognition engines.

19. The method as defined in claim 12, wherein the step of developing a set of feature vectors representing energy of a frequency content of the sampled data includes the operations of:
transforming a spectrum comprising normalized post-noise-reduction speech data using Mel frequency bands to form a plurality of Mel coefficients;
applying a Fourier transform to the Mel coefficients to form a Mel Spaced Cepstrum; and
determining first and second derivatives of the Mel Spaced Cepstrum.

20. The method as defined in claim 12, wherein the step of estimating noise power includes the step of estimating noise power for each of a plurality of time slices on either side of the speech near and outside boundaries of the speech for each of a plurality of frequency ranges to thereby determine a background noise contour for noise within the observation window.

21. The method as defined in claim 20, wherein
the parameterized threshold value is a predetermined parameterized value to remove the noise from the speech; and
wherein the step of thresholding includes setting each equalized bin having a value at or below the predetermined parameterized threshold value to a nominal value.

22. The method as defined in claim 21, wherein the step of the thresholding includes the steps of:
comparing each of the plurality of bins for each of the plurality of time slices to the parameterized value; and
setting each bin having a value below the parameterized value to approximately zero to thereby remove from the sampled data the noise within and around speech formants.

23. The method as defined in claim 21, further comprising the step of:
performing a cropping analysis on the sampled data to determine if the speech is potentially missing portions of energy.

24. The method as defined in claim 21, further comprising the step of:
performing a misalignment analysis on the sampled data to determine if the speech was successfully aligned during noise removal.

25. The method as defined in claim 21,
wherein when performing speech training the method further includes the steps of assigning an index to the at least one speech recognition model associated with the speech and storing the at least one speech recognition model and the assigned index; and
wherein when performing speech recognition the method further includes the steps of:
returning the index associated with a stored speech recognition model determined to match sampled data received during speech recognition,
displaying a confidence score indicating likelihood the match is correct, and
executing an assigned function or forming an assigned state when the confidence score is above a preselected or selected threshold value.

26. The method as defined in claim 25,
wherein the speech recognition models are stored in one of a plurality of vocabulary templates;
wherein each vocabulary template is associated with a different one of a plurality of predetermined operational profiles; and wherein the parameterized value is preselected responsive to analysis of noise conditions of a selected one of the plurality of predetermined operational profiles.

27. A method to provide speech-activated control of aerial vehicle components, the method comprising the steps of:
(a) performing noise reduction processing on sampled speech data representing a command annunciation to remove noise from within and around speech formants of the sampled speech, to include:
estimating noise power for each separate set of a plurality of bins having a same frequency range across a plurality of time slices of the sampled speech data to thereby provide a plurality of frequency range-specific noise power estimates,
equalizing energy values of each set of bins having a same frequency range across the plurality of time slices responsive to the respective frequency range-specific noise power estimate, and
thresholding each equalized bin by a parameterized threshold value to remove noise from within and around speech formants of the sampled speech data;
(b) developing a set of feature vectors representing energy of a frequency content of the sampled speech data to thereby determine a unique pattern identifying the command annunciation;
(c) applying a speech recognition engine to the set of feature vectors to thereby form at least one speech recognition model;
(d) associating an index with the at least one speech recognition model associated with the command annunciation; and
(e) storing the at least one speech recognition model and the assigned index.

28. The method as defined in claim 27, further comprising the steps of
receiving a command function or system state;
receiving the command associated annunciation real-time in-flight; and
associating the command function or system state with a representation of the command annunciation.

29. The method as defined in claim 27, further comprising the steps of:
recording during aircraft operation a series of switch engagements to form a speech-activated switch macro describing a command function or system state;
receiving the associated command annunciation real-time in-flight; and
associating the speech-activated switch macro with a representation of the command annunciation.

30. The method as defined in claim 27, wherein the sampled speech data is a first sampled data processed to form a stored speech model during a speech recognition model training event, wherein the command annunciation is a first command annunciation, and wherein the method further comprises the steps of:
responsive to a second command annunciation received during a recognition event, returning the index associated with the stored speech model determined to match a second sampled data;
returning a confidence score indicating likelihood the match is correct; and
executing an assigned function or forming an assigned state when the confidence score is above a preselected or selected threshold value.

31. The method as defined in claim 27, wherein the sampled speech data is a first sampled data processed to form a stored speech model during a speech recognition model training event, wherein the command annunciation is a first command annunciation, and wherein the method further comprises the steps of:
responsive to a second command annunciation received during a recognition event, performing a dynamic range utilization analysis on a second sampled data to determine if the speech is below a preselected minimum threshold level indicating the speech was too quiet;
performing a clipping analysis on the second sampled data to determine if the speech has exceeded a preselected maximum value indicating that clipping has occurred; and
performing a cropping analysis on the second sampled data to determine if the speech is potentially missing portions of energy.

* * * * *